United States Patent
Bishop et al.

(10) Patent No.: US 9,843,447 B1
(45) Date of Patent: *Dec. 12, 2017

(54) AUTHENTICATING ELECTRONIC CONTENT

(75) Inventors: Fred Bishop, Glendale, AZ (US); Danielle R. Domenica, Phoenix, AZ (US); Vicki R. Mendivil, Phoenix, AZ (US); Hermes H. Villalobos, Phoenix, AZ (US)

(73) Assignee: SECURE AXCESS LLC, Plano, TX (US)

( * ) Notice: Subject to any disclaimer, the term of this patent is extended or adjusted under 35 U.S.C. 154(b) by 584 days.

This patent is subject to a terminal disclaimer.

(21) Appl. No.: 10/906,856

(22) Filed: Mar. 9, 2005

Related U.S. Application Data

(63) Continuation-in-part of application No. 09/656,074, filed on Sep. 6, 2000, now Pat. No. 7,203,838.

(Continued)

(51) Int. Cl.
*H04L 9/32* (2006.01)
*G06F 21/64* (2013.01)
(Continued)

(52) U.S. Cl.
CPC ............... *H04L 9/32* (2013.01); *G06F 21/33* (2013.01); *G06F 21/6272* (2013.01);
(Continued)

(58) Field of Classification Search
CPC .... G06F 21/6272; G06F 21/64; G06F 21/645; G06F 21/33; H04L 63/1483;
(Continued)

(56) References Cited

U.S. PATENT DOCUMENTS

| 4,694,407 A | * | 9/1987 | Ogden ................. G06T 11/001 345/440 |
| 5,065,447 A | * | 11/1991 | Barnsley et al. ............. 382/249 |

(Continued)

FOREIGN PATENT DOCUMENTS

| EP | 0 798 657 A2 | 10/1997 |
| EP | 0 883 284 A2 | 12/1998 |

(Continued)

OTHER PUBLICATIONS

J. J C.Davis, "Protecting intellectual property in cyberspace," in IEEE Technology and Society Magazine, vol. 17, no. 2, pp. 12-25, Summer 1998.*
Berghel, Hal. "Digital watermarking makes its mark." Networker 2.4 Acm:(1998): 30-39.*
"TRUSTe: an Online Privacy Seal Program", Paola Benassi; Communications of the ACM, vol. 42 Issue 2, Feb. 1999.
(Continued)

*Primary Examiner* — Kari Schmidt
(74) *Attorney, Agent, or Firm* — Martin & Ferraro, LLP

(57) ABSTRACT

The present invention provides for an authenticity marker to be embedded within web page and/or email content which allows a user to validate that the content originates from the true source of the content and is not merely a copy. The method includes a user requesting content in the form of a web page and/or email from a server using a web browser or email client. The server receives the request, retrieves the content and forwards it to an authentication server. The authentication server inserts into the retrieved content a unique fractal icon and/or information only known between the owner of the content and the user.

16 Claims, 12 Drawing Sheets

Related U.S. Application Data

(60) Provisional application No. 60/153,004, filed on Sep. 9, 1999.

(51) Int. Cl.
*H04L 29/06* (2006.01)
*G06F 21/62* (2013.01)
*H04L 9/14* (2006.01)
*G06F 21/33* (2013.01)

(52) U.S. Cl.
CPC ............ *G06F 21/64* (2013.01); *G06F 21/645* (2013.01); *H04L 9/14* (2013.01); *H04L 63/126* (2013.01); *H04L 63/1466* (2013.01); *H04L 63/1483* (2013.01)
USPC ........................................................ 713/176

(58) Field of Classification Search
CPC ......... H04L 63/1466; H04L 9/32; H04L 9/14; H04L 63/126
USPC .......................... 713/176–180; 380/277, 279
See application file for complete search history.

(56) References Cited

U.S. PATENT DOCUMENTS

| | | | |
|---|---|---|---|
| 5,261,043 A | 11/1993 | Wolber et al. | |
| 5,365,360 A | 11/1994 | Torres | |
| 5,425,102 A * | 6/1995 | Moy ............................ | 713/183 |
| 5,475,756 A | 12/1995 | Merritt | |
| 5,497,422 A | 3/1996 | Tysen et al. | |
| 5,530,856 A | 6/1996 | Dahod et al. | |
| 5,559,961 A * | 9/1996 | Blonder ......................... | 726/18 |
| 5,606,609 A | 2/1997 | Houser et al. | |
| 5,646,997 A | 7/1997 | Barton | |
| 5,664,099 A | 9/1997 | Ozzie et al. | |
| 5,752,022 A | 5/1998 | Chiu et al. | |
| 5,765,176 A | 6/1998 | Bloomberg | |
| 5,768,437 A * | 6/1998 | Monro ..................... | G06T 9/001 358/426.14 |
| 5,784,463 A | 7/1998 | Chen et al. | |
| 5,809,317 A | 9/1998 | Kogan et al. | |
| 5,826,029 A * | 10/1998 | Gore, Jr. ................. | H04L 29/06 709/203 |
| 5,841,978 A | 11/1998 | Rhoads | |
| 5,872,850 A | 2/1999 | Klein et al. | |
| 5,875,249 A | 2/1999 | Mintzer et al. | |
| 5,889,868 A | 3/1999 | Moskowitz et al. | |
| 5,890,170 A | 3/1999 | Sidana | |
| 5,892,904 A | 4/1999 | Atkinson et al. | |
| 5,893,127 A | 4/1999 | Tyan et al. | |
| 5,905,800 A | 5/1999 | Moskowitz et al. | |
| 5,907,619 A | 5/1999 | Davis | |
| 5,930,792 A | 7/1999 | Polcyn | |
| 5,948,103 A | 9/1999 | Fukuzaki | |
| 5,978,475 A | 11/1999 | Schneier et al. | |
| 5,982,506 A | 11/1999 | Kara | |
| RE36,444 E | 12/1999 | Sanchez-Frank et al. | |
| 6,016,491 A | 1/2000 | Kou | |
| 6,018,724 A | 1/2000 | Arent | |
| 6,018,801 A * | 1/2000 | Palage et al. ..................... | 726/2 |
| 6,035,402 A | 3/2000 | Vaeth et al. | |
| 6,047,374 A | 4/2000 | Barton | |
| 6,085,324 A | 7/2000 | Ogram | |
| 6,092,053 A | 7/2000 | Boesch et al. | |
| 6,131,162 A | 10/2000 | Yoshiura et al. | |
| 6,134,658 A | 10/2000 | Multerer et al. | |
| 6,185,682 B1 | 2/2001 | Tang | |
| 6,209,104 B1 * | 3/2001 | Jalili ............................ | 726/18 |
| 6,247,047 B1 | 6/2001 | Wolff | |
| 6,260,145 B1 * | 7/2001 | Komura et al. .............. | 713/176 |
| 6,286,001 B1 | 9/2001 | Walker et al. | |
| 6,331,865 B1 | 12/2001 | Sachs et al. | |
| 6,366,912 B1 | 4/2002 | Wallent et al. | |
| 6,442,696 B1 * | 8/2002 | Wray ..................... | G06F 21/31 713/176 |
| 6,453,416 B1 | 9/2002 | Epstein | |
| 6,539,093 B1 | 3/2003 | Asad et al. | |
| 6,611,830 B2 | 8/2003 | Shinoda et al. | |
| 6,618,717 B1 | 9/2003 | Karadimitriou et al. | |
| 6,681,017 B1 | 1/2004 | Matias et al. | |
| 6,735,694 B1 | 5/2004 | Berstis et al. | |
| 6,745,327 B1 | 6/2004 | Messing | |
| 6,778,986 B1 | 8/2004 | Stern et al. | |
| 6,785,717 B1 | 8/2004 | Nickerson et al. | |
| 6,973,619 B1 | 12/2005 | Hirose et al. | |
| 6,981,016 B1 * | 12/2005 | Ryan ............................ | 709/203 |
| 7,203,838 B1 | 4/2007 | Glazer et al. | |
| 7,216,232 B1 | 5/2007 | Cox et al. | |
| 7,243,236 B1 | 7/2007 | Sibert | |
| 7,631,191 B2 | 12/2009 | Glazer et al. | |
| 2001/0056487 A1 | 12/2001 | Yoo | |
| 2002/0002543 A1 | 1/2002 | Spooren et al. | |
| 2002/0029252 A1 | 3/2002 | Segan et al. | |
| 2002/0059364 A1 | 5/2002 | Coulthard et al. | |
| 2002/0061120 A1 * | 5/2002 | Carr ....................... | B42D 25/21 382/100 |
| 2002/0124172 A1 | 9/2002 | Manahan | |
| 2003/0023878 A1 | 1/2003 | Rosenberg et al. | |
| 2003/0093699 A1 | 5/2003 | Banning et al. | |
| 2003/0110384 A1 | 6/2003 | Carro | |
| 2003/0131048 A1 | 7/2003 | Najork | |
| 2003/0158823 A1 | 8/2003 | Fulton et al. | |
| 2004/0078452 A1 | 4/2004 | Jamieson | |
| 2005/0075964 A1 * | 4/2005 | Quinn et al. .................... | 705/37 |
| 2006/0200667 A1 * | 9/2006 | Cameron ............ | H04L 63/0823 713/168 |

FOREIGN PATENT DOCUMENTS

| | | |
|---|---|---|
| EP | 0 982 927 A1 | 3/2000 |
| JP | 10-313308 A | 11/1998 |
| WO | WO 97/04394 A1 | 2/1997 |
| WO | WO 97/50036 A1 | 12/1997 |
| WO | WO 98/37655 | 8/1998 |
| WO | WO 01/18636 A1 | 3/2001 |

OTHER PUBLICATIONS

"CommerceNet: Spontaneous Electronic Commerce on the Internet", Tenenbaum et al., Compcon 1995, Technologies for the Information Superhighway, Mar. 5-9, 1995.
"Is the Internet Heading for a Cache Crunch?", Russell Tewksbury, OnTheInternet Magazine, International Publication of the Internet Society, Jan./Feb. 1998.
"Consumer Perceptions of CPA WebTrustSM Assurances: Evidence of an Expectation Gap", Richard W. Houston, Gary K. Taylor, International Journal of Auditing 3 (2), 89-105, Jul. 1999.
"Local Control over Filtered WWW Access", BS Baker, E Grosse, Fourth International World Wide Web Conference, 1995.
"Beyond Browsing: Shared Comments, SOAPs, Trails, and On-line Communities", Roscheisen et al., Computer Networks and ISDN Systems, 1995.
"Trust in Web-Based Electronic Commerce Security", Pauline Ratnasingham, Information Management & Computer Security, vol. 6 Issue: 4 p. 162-166, 1998.
"Secure Transactions: Beyond Phase 1", Don Sheehy, CA Magazine, Mar. 1999.
"Trust Management for the World Wide Web", Yang-hua Chu, Thesis for Degree of Master of Engineering in Electrical Engineering and Computer Science at the Massachusetts Institute of Technology, Jun. 13, 1997.
*Secure Axcess, LLC* vs. *Bank of America Corp., et al.*; Civil Action No. 6:10-CV-670; Defendants' Invalidity Contentions; Oct. 12, 2011; 1078 pages.
"ABA Launches Electronic Commerce Subsidiary," PRNewswire, Sep. 28, 1998, 3 pages.
ANSI X9.30-2; Public Key Cryptography for the Financial Services Industry—Part 2: The Secure Hash Algorithm (SHA-1); 1997; 38 pages.

(56) References Cited

OTHER PUBLICATIONS

Baker, BS, et al.; "Local Control over Filtered WWW Access"; Fourth International World Wide Web Conference; 1995; 10 pages.

Belani, Eshwar, et al.; "Authentication and Security in WebFS;" Oct. 1997; 14 pages.

Bell, et al.; "PGP Signed Web-Pages;" http://www.pobox.com/~ejnball/pgp-www.html; 1997; 3 pages.

Benassi, Paola; "TRUSTe: an Online Privacy Seal Program"; Communications of the ACM; vol. 42, No. 2; Feb. 1999; pp. 56-59.

CheckFreeWeb screen print; 2011; 1 page.

Chu, Yang-hua; "Trust Management for the World Wide Web"; Thesis for Degree of Master of Engineering in Electrical Engineering and Computer Science at the Massachusetts Institute of Technology; Jun. 13, 1997; 62 pages.

Demand for International Preliminary Examination for Application No. PCT/US00/24431; dated Apr. 5, 2001; 4 pages.

File History for Application No. PCT/US00/24431; 124 pages.

Goldberg, Jeffrey; "This is a signed html page;" http://www.cranfield.ac.uk/docs/email/pgp/html/signed_html.html; Oct. 20, 2000; 1 page.

Haney, Clare; "American Express Goes Shopping Online With Blue;" Sep. 9, 1999; 4 pages.

Houston, Richard W., et al.; "Consumer Perceptions of CPA WebTrustSM Assurances: Evidence of an Expectation Gap"; International Journal of Auditing 3 (2), pp. 89-105; Jul. 1999.

International Preliminary Examination Report from Application No. PCT/US 00/24431; dated Feb. 11, 2002; 15 pages.

International Search Report from Application No. PCT/US 00/24431; dated Dec. 18, 2000; 2 pages.

Islam, Nayeem, et al.; "A Flexible Security Model for Using Internet Content"; IBM Thomas J. Watson Research Center; Oct. 1997; 15 pages.

Islam, Nayeem, et al.; "A Flexible Security Model for Using Internet Content"; IBM Thomas J. Watson Research Center; Jun. 28, 1997; 11 pages.

O'Reilly & Associates; "SSH: The Secure Shell;" 1.5 History of SSH; 2002; 2 pages.

Penn, Jonathan; ForrTel: Phishing: Understanding and Fighting Email Fraud; Jun. 14, 2004; 19 pages.

PNC Online Banking screen print; undated; 1 page.

Ratnasingham, Pauline; "Trust in Web-Based Electronic Commerce Security"; Information Management & Computer Security; vol. 6, Issue: 4; pp. 162-166; 1998.

Reply to Written Opion from Application No. PCT/US00/24431; dated Oct. 30, 2001; 10 pages.

Reply to Written Opion from Application No. PCT/US00/24431; dated Dec. 18, 2001; 10 pages.

Rescorla, E., et al.; Network Working Group; RFC 2660; "The Secure HyperText Transfer Protocol"; Aug. 1999; 32 pages.

Roscheisen, et al.; "Beyond Browsing: Shared Comments, SOAPs, Trails, and On-line Communities"; Computer Networks and ISDN Systems; 1995; 7 pages.

Schneider, Bruce; "Applied Cryptography: Protocols, Algorithms, and Source Code in C"; published by John Wiley & Sons; second edition; 1996; 662 pages.

"SET Secure Electronic Transaction Specification;" Book 1: Business Description, Version 1.0; May 31, 1997; 80 pages.

"SET Secure Electronic Transaction Specification;" Book 2: Programmer's Guide, Version 1.0; May 31, 1997; 629 pages.

"SET Secure Electronic Transaction Specification;" Book 3: Formal Protocol Definition, Version 1.0; May 31, 1997; 262 pages.

Sheehy, Don; "Secure Transactions: Beyond Phase 1"; CA Magazine; Mar. 1999; 3 pages.

Tenenbaum, et al.; "CommerceNet: Spontaneous Electronic Commerce on the Internet"; Compcon 1995; Technologies for the Information Superhighway; Mar. 5-9, 1995; pp. 38-43.

Tewksbury, Russell; "Is the Internet Heading for a Cache Crunch?"; OnTheInternet Magazine; International Publication of the Internet Society; Jan./Feb. 1998; 11 pages.

U.S. Department of Commerce/National Institute of Standards and Technology; FIPS Pub 180—Secure Hash Standard; May 11, 1993; 5 pages.

U.S. Department of Commerce/National Institute of Standards and Technology; FIPS Pub 180-1—Federal Information Processing Standards Publication; Apr. 17, 1995; 24 pages.

http://www-server.bcc.ac.uk/~ccaatnrg/seal/seal.html (site not accessible).

Wikipedia Entry for Secure Shell; dated Jan. 10, 2012.

Written Opinion from Application No. PCT/US00/24431; dated Jul. 30, 2001; 7 pages.

Written Opinion from Application No. PCT/US00/24431; dated Nov. 27, 2001; 5 pages.

*Secure Axcess, LLC* vs. *Bank of America Corp., et al.*; Civil Action No. 6:10-CV-670; Defendants' Supplemental Invalidity Contentions; Feb. 2, 2012; 177 pages.

*Secure Axcess, LLC* vs. *Bank of America Corp., et al.*; Civil Action No. 6:10-CV-670; Expert Report of the Hon. Lawrence J. Goffney, Jr.; Aug. 24, 2012; 53 pages.

*Secure Axcess, LLC* vs. *Bank of America Corp., et al.*; Civil Action No. 6:10-CV-670; Affirmative Expert Report of Professor Patrick McDaniel Regarding the Invalidity of U.S. Patent No. 7,631,191; Aug. 24, 2012; 169 pages.

*Secure Axcess, LLC* vs. *Bank of America Corp., et al.*; Civil Action No. 6:10-CV-670; Expert Witness Report of Neeraj Gupta Rebuttal Report on Validity; Oct. 10, 2012; 69 pages.

Kohl, J., et al.; The Kerberos Network Authtication Service (V5); Network Working Group Request for Comments: 1510; 112 pages.

Ylönen, Tatu; SSH—Secure Login Connections over the Internet; Proceedings of the Sixth USENIX Security Symposium; Jul. 22-25, 1996 (Last changed Jan. 10, 2003); 8 pages.

*Secure Axcess, LLC* vs. *Bank of America Corp., et al.*; Civil Action No. 6:10-CV-670; Bank of America Corporation and Bank of America, N.A.'s First Amended Answer, Affirmative Defenses, and Original Counterclaims to Plaintiff's Original Complaint for Patent Infringement; Nov. 11, 2011; 36 pages.

*Secure Axcess, LLC* vs. *Bank of America Corp., et al.*; Civil Action No. 6:10-CV-670; Bank of America Corporation and Bank of America, N.A.'s Second Amended Answer, Affirmative Defenses, and First Amended Counterclaims to Plaintiff's Original Complaint for Patent Infringement; Apr. 25, 2012; 36 pages.

*Secure Axcess, LLC* vs. *Bank of America Corp., et al.*; Civil Action No. 6:10-CV-670; Bank of America Corporation and Bank of America, N.A.'s Second Amended Answer, Affirmative Defenses, and Original Counterclaims to Plaintiffs Original Complaint for Patent Infringement; Feb. 23, 2012; 37 pages.

*Secure Axcess, LLC* vs. *Bank of America Corp., et al.*; Civil Action No. 6:10-CV-670; Defendants' Corrected Reply in Support of its Motion for Partial Summary Judgment of Invalidity for Indefiniteness; May 4, 2012; 12 pages.

*Secure Axcess, LLC* vs. *Bank of America Corp., et al.*; Civil Action No. 6:10-CV-670; Defendants' Mar. 16, 2012 Letter re Indefiniteness to Court; Mar. 16, 2012; 12 pages.

*Secure Axcess, LLC* vs. *Bank of America Corp., et al.*; Civil Action No. 6:10-CV-670; First Amended Answer, Affirmative Defenses and Counterclaims of Defendants Bank of the Ozarks and Bank of the Ozarks, Inc.; Nov. 11, 2011; 28 pages.

*Secure Axcess, LLC* vs. *Bank of America Corp., et al.*; Civil Action No. 6:10-CV-670; First Amended Answer, Affirmative Defenses and First Amended Counterclaims of Defendants Bank of the Ozarks and Bank of the Ozarks, Inc.; Apr. 26, 2012; 28 pages.

*Secure Axcess, LLC* vs. *Bank of America Corp., et al.*; Civil Action No. 6:10-CV-670; Original Complaint for Patent Infringement; Dec. 16, 2010; 19 pages.

*Secure Axcess, LLC* vs. *Bank of America Corp., et al.*; Civil Action No. 6:10-CV-670; Plaintiff Secure Axcess, LLC's Amended and Supplemented Objections and Responses to Defendants' First Set of Common Interrogatories; May 28, 2012; 16 pages.

*Secure Axcess, LLC* vs. *Bank of America Corp., et al.*; Civil Action No. 6:10-CV-670; Plaintiff Secure Axcess, LLC's Objections and Responses to Defendants' First Set of Common Interrogatories; Nov. 22, 2011; 15 pages.

(56) References Cited

OTHER PUBLICATIONS

*Secure Axcess, LLC* vs. *Bank of America Corp., et al.*; Civil Action No. 6:10-CV-670; Secure Axcess LLC's Answer to Bank of the America Corporation and Bank of America N.A.'s First Amended Counterclaims to Plaintiff's Complaint for Patent Infringement; Dec. 2, 2011; 18 pages.

*Secure Axcess, LLC* vs. *Bank of America Corp.*, et al.; Civil Action No. 6:10-CV-670; Secure Axcess LLC's Answer to Bank of the America Corporation and Bank of America N.A.'s First Amended Counterclaims to Plaintiffs Complaint for Patent Infringement; May 16, 2012; 18 pages.

*Secure Axcess, LLC* vs. *Bank of America Corp., et al.*; Civil Action No. 6:10-CV-670; Secure Axcess LLC's Answer to Bank of the Ozarks and Bank of the Ozarks, Inc.'s First Amended Counterclaims to Plaintiffs Complaint for Patent Infringement; Feb. 2, 2011; 18 pages.

*Secure Axcess, LLC* vs. *Bank of America Corp., et al.*; Civil Action No. 6:10-CV-670; Secure Axcess LLC's Answer to Bank of the Ozarks and Bank of the Ozarks, Inc.'s First Amended Counterclaims to Plaintiffs Complaint for Patent Infringement; May 16, 2012; 17 pages.

*Secure Axcess, LLC* vs. *Bank of America Corp., et al.*; Plaintiffs Apr. 2, 2012 Letter Brief in Response to Defendants' Request for Permission to File Motion for Summary Judgment of Invalidity of Claims 1-30 of the '191 patent; 10 pages.

*Secure Axcess, LLC* vs. *Bank of America Corp., et al.*; Plaintiffs Mar. 16, 2012 Letter Brief Requesting Permission to File Motion for Summary Judgment of Indefiniteness as to Claims 1-30 of the '191 patent; 6 pages.

Bellovin, Steven M.; Distributed Firewalls; Login; pp. 39-47, Nov. 1999, Section 7.5.

Secure Axcess, LLC's Patent Owner Preliminary Response Pursuant to 37 C.F.R. § 42.107(a); IPR2014-00475; May 14, 2014, 59 pages.

Decision—Institution of Inter Partes Review; IPR2014-00475; entered Sep. 9, 2014; 34 pages.

Patent Owner Secure Axcess, LLC's Patent Owner Preliminary Response; CBM2014-00100; Jul. 9, 2014; 77 pages.

Decision—Institution of Covered Business Method Patent Review; CBM2014-00100; entered Sep. 9, 2014; 36 pages.

Petition for Inter Partes Review of U.S. Pat. No. 7,631,191 under 35 U.S.C. § 312 and 37 C.F.R. § 42.104; Case No. IPR2014-00475; filed Mar. 4, 2014; 914 pages.

Declaration of J. Douglas Tygar, Ph.D.; Case No. IPR2014-00475; filed Mar. 4, 2014; 122 pages.

Anderson, Ross, et al.; "The Steganographic File System;" Information Hiding; Second International Workshop; Apr. 1998; 17 pages.

Bender, W., et al.; "Techniques for data hiding;" IBM Systems Journal, vol. 35, No. 3-4; 1996; 24 pages.

Denning, Dorothy E., et al.; "A Taxonomy for Key Escrow Encryption Systems;" Comm. Of the ACM, vol. 39, No. 4, pp. 34-40; Mar. 1996.

Digital Signature Standard; Federal Information Processing Standards Publication; FIPS PUB 186-1; Dec. 15, 1998; 24 pages.

Falstrom; "MIME Encapsulation of Macintosh files—Mac-MIME;" Request for Comments: 1740; Internet Engineering Task Force; Dec. 1994.

Kohnfelder, Loren M.; "Towards a Practical Public-key Cryptosystem;" pp. 39-43; Thesis submitted at the Massachusetts Institute of Technology; May 1978.

Kou, Weidong; "Networking Security and Standards;" The Kluwer Int'l Series in Engineering and Computer Science; pp. 69-89; Springer-Science Business Media, LLC; 1997.

Kravitz, Jeff; "SDML—Signed Document Markup Language;" W#C Note 19, 1998 Financial Service Technology Consortium (Jun. 1998); http://www.w3.org/TR/NOTE-SDML/.

Merriam-Webster's Collegiate Dictionary Tenth Edition p. 684 "locale to locution"; 1993; 3 pages.

Peticolas, Fabien, et al.; "Information Hiding—A Survey;" Proceedings of the IEEE; Jul. 1999; 17 pages.

Rec. X.509; "The Directory—Authentication Framework;" Nov. 11, 1988; available at http://www.itu.int/rec/T-Rec-X.506-198811-S.

Rivest, R. L., et al; "A Method for Obtaining Digital Signatures and Public-Key Cryptosystems;" MIT Laboratory for Computer Science and Department of Mathematics; Communications of the ACM vol. 21, No. 2; Feb. 1978; 7 pages.

Schneier, Bruce; "Applied Cryptography: Protocols, Algorithms, and Source Code in C"; published by John Wiley & Sons; second edition; 1996; pp. 39-41.

Takada, et al.; "NIGELOG: Protecting Logging Information by Hiding Multiple Backups in Directories;" Proceedings of Tenth International Workshop on Database and Expert Systems Applications (The Institute of Electrical and Electronics Engineers, Inc.; Sep. 1-3, 1999.

Tygar, J.D., et al.; "WWW Electronic Commerce and Java Trojan Horses;" Proceedings of the 2nd USENIX Workshop on Electronic Commerce; Nov. 1996; 8 pages.

van der Linden, Peter; "not just JAVA;" Sun Microsystems; 1997; 5 pages.

"Web Security;" http://www.jisc.ac.uk/publications/reports/1997/acnwebsecurity.aspx; 18 pages.

Weeks, Judson D., et al.; "CCI-Based Web Security, A Design Using PGP;" World Wide Web Journal; Fourth International World Wide Web Conference; Dec. 11-14, 1995; 23 pages.

Petition for Covered Business Method Review of U.S. Pat. No. 7,631,191 under section 18 of the Leahy-Smith; America Invents Act and 37 C.F.R. § 42.300 with Exhibits; Nov. 21, 2014; 871 pages.

Declaration of Mr. Bruce Schneier; Case No. IPR2015-00027; filed Nov. 20, 2014; 35 pages.

*Secure Axcess, LLC*vs. *Bank of America Corp.*, et al.; Civil Action No. 6:10-CV-670; Memorandum Opinion and Order; Jul. 9, 2012; 21 pages.

*Secure Axcess, LLC*v. *T. Rowe Price Investment Services, Inc., T. Rowe Price Associates, Inc., and T. Rowe Price Group, Inc.*; Civil Action No. 6:13-CV-787; Original Complaint for Patent Infringement; Oct. 16, 2013; 8 pages.

Excerpts from Notary Law & Practice; National Notary Association; 1997; 26 pages.

National Notary Association; "What Is Notarization?" http://www.nationalnotary.org/knowledge-center/about-notaries/what-is-notarization; 2014; 2 pages.

Rothman, Raymond C.; Excerpts from "Notary Public—practices & glossary"; 1978; 8 pages.

Secure Axcess, LLC's Patent Owner Preliminary Response Pursuant to 37 C.F.R. § 42.107(a); IPR2014- 00475; Jun. 11, 2014; 61 pages.

File History of U.S. Pat. No. 7,631,191; filed Jun. 9, 2006; 374 pages.

File History of U.S. Pat. No. 7,203,838; filed Sep. 6, 2000; 360 pages.

*PNC Bank, National Association, U.S. Bancorp, and U.S. Bank, National Association* v. *Secure Axcess, Lilac*; Declaration of Paul C. Clark; Mar. 28, 2014; 85 pages.

U.S. Appl. No. 60/153,004; filed Sep. 9, 1999; 9 pages.

Petition for Post-Grant Review (Covered Business Method Review) Under 35 U.S.C. § 321 and § 18 of the Leahy-Smith America Invents Act for U.S. Pat. No. 7,631,191 with Exhibits; dated Oct. 8, 2014; 1602 pages.

*Secure Axcess, LLC* vs. *Bank of America Corp., et al.*; Civil Action No. 6:10-CV-670; Memorandum Opinion and Order; Jul. 9, 2012; 21 pages.

*Secure Axcess, LLC* vs. *Bank of America Corp.*, et al.; Civil Action No. 6:10-CV-670; Memorandum Opinion and Order; Apr. 26, 2013; 11 pages.

*Secure Axcess, LLC* v. *U.S. Bank National Association and U.S. Bancorp*; Civil Action No. 6:13-CV-717; Original Complaint for Patent Infringement; Sep. 27, 2013; 8 pages.

*Secure Axcess, LLC* v. *Ally Bank and Ally Financial Inc.*; Civil Action No. 6:13-CV-718; Original Complaint for Patent Infringement; Sep. 27, 2013; 8 pages.

(56) References Cited

OTHER PUBLICATIONS

*Secure Axcess, LLC v. GE Capital Retail Bank, GE Capital Bank, General Electric Capital Corporation, and General Electric Company*; Civil Action No. 6:13-CV-720; Original Complaint for Patent Infringement; Sep. 27, 2013; 8 pages.
*Secure Axcess, LLC v. Nationwide Bank, Nationwide Financial Services, Inc., Nationwide Corporation, and Nationwide Mutual Insurance Company*; Civil Action No. 6:13-CV-721; Original Complaint for Patent Infringement; Sep. 27, 2013; 8 pages.
*Secure Axcess, LLC v. PNC Bank, National Association and the PNC Financial Services Group, Inc.*; Civil Action No. 6:13-CV-722; Original Complaint for Patent Infringement; Sep. 27, 2013; 8 pages.
*Secure Axcess, LLC v. Sovereign Bank, National Association*; Civil Action No. 6:13-CV-723; Original Complaint for Patent Infringement; Sep. 27, 2013; 7 pages.
*Secure Axcess, LLC v. Bank of the West and BNP Paribas*; Civil Action No. 6:13-CV-779; Original Complaint for Patent Infringement; Oct. 16, 2013; 8 pages.
*Secure Axcess, LLC v. Cadence Bank, National Association*; Civil Action No. 6:13-CV-780; Original Complaint for Patent Infringement; Oct. 16, 2013; 7 pages.
*Secure Axcess, LLC v. Commerce Bank and Commerce Bancshares, Inc.*; Civil Action No. 6:13-CV-782; Original Complaint for Patent Infringement; Oct. 16, 2013; 8 pages.
*Secure Axcess, LLC v. Raymond James & Associates, Inc. and Raymond James Financial, Inc.*; Civil Action No. 6:13-CV-785; Original Complaint for Patent Infringement; Oct. 16, 2013; 8 pages.
*Secure Axcess, LLC v. Trustmark National Bank and Trustmark Corporation*; Civil Action No. 6:13-CV-788; Original Complaint for Patent Infringement; Oct. 16, 2013; 8 pages.
Excerpts from IEEE Dictionary, 7th Edition; 2000; 5 pages.
Random House Webster's College Dictionary; p. 433; 2000; 4 pages.
Rescorla, E., et al.; "The Secure HyperText Transfer Protocol"; Jul. 1996; 49 pages.
Secure Axcess, LLC's Patent Owner Response (with exhibit); IPR2014-00475; Dec. 22, 2014; 382 pages.
Petitioner's Reply (with exhibits); IPR2014-00475; Mar. 18, 2015; 315 pages.
Patent Owner Secure Access's Observations on Cross-Examination of Dr. Tygar (with exhibits); IPR2014- 00475; Apr. 17, 2015; 123 pages.
Petitioner's Response to Patent Owner's Motion for Observation on Cross-Examination of Petitioner's Reply Witness J. Douglas Tygar, Ph.D. (with exhibits); IPR2014-00475; May 1, 2015; 45 pages.
Demonstrative Information Prepared by Paul C. Clark; CBM2014-00100; filed Dec. 11, 2014; 222 pages.
Deposition Transcript of Dr. Paul C. Clark; CBM2014-00100; filed Dec. 11, 2014; 92 pages.
Secure Axcess, LLC's Patent Owner Response (with exhibits); CBM2014-00100; filed Dec. 22, 2014; 197 pages.
Petitioner's Reply to Patent Owner's Response Pursuant to 37 C.F.R. § 42.24 (with exhibits); CBM2014-00100; filed Mar. 18, 2015; 49 pages.
Petitioner's Updated Exhibit List (with exhibit); CBM2014-00100; filed Apr. 7, 2015; 37 pages.
Petitioner's Updated Exhibit List (with exhibits); CBM2014-00100; filed Apr. 20, 2015; 186 pages.
Patent Owner Secure Axcess's Observations on Cross-Examination of Dr. Clark (with exhibit); CBM2014-00100; filed Apr. 20, 2015; 76 pages.
Petitioner's Reply to Patent Owner's Observations on Cross-Examination of Dr. Clark; CBM2014-00100; filed May 1, 2015; 10 pages.
Patent Owner Secure Axcess, LLC's Patent Owner Preliminary Response (with exhibits); CBM2015-00009; filed Jan. 16, 2015; 150 pages.
Decision —Institution of Covered Business Method Patent Review; CBM2015-00009; entered Apr. 13, 2015; 26 pages.

Patent Owner Secure Axcess, LLC's Patent Owner Preliminary Response (with exhibits); CBM2015-00027; filed Mar. 23, 2015; 158 pages.
Petition for Post-Grant Review Under 35 U.S.C. § 321 and § 18 of the Leahy-Smith America Invents Act for U.S. Pat. No. 7,631,191 with Exhibits; Dec. 20,2014; 941 pages.
*Secure Axcess, LLC vs. PNC Bank, National Association, Declaration of William T. Wong*; filed on Dec. 20,2014; 82 pages.
Revised Petition for Post-Grant Review Under 35 U.S.C. § 321 and § 18 of the Leahy-Smith America Invents Act for U.S. Pat. No. 7,631,191; Jan. 21, 2015; 91 pages.
Patent Owner Secure Axcess, LLC's Patent Owner Preliminary Response (with exhibits); Apr. 14, 2015; 159 pages.
*Secure Axcess, LLC v. U.S. Bank, National Association et al.*, No. 6:13-cv-717; Order to Grant Renewed Motion to Stay; Oct. 20, 2014; 11 pages.
README.resources.html; These X Resources are Current in NCSA X Mosaic v2.7b4; 1996; 13 pages.
Shostack, Adam; An Overview of SHTTP; May 1995; 6 pages.
Terisa System; SecureWeb Documents User's Guide; Oct. 1996; 34 pages.
The American Heritage College Dictionary, third edition; "inseminate to insoluble"; 1997; 3 pages.
Wong, William T.; Secure NCSA Mosaic Reference Manual, Enterprise Integration Technologies; Nov. 19, 1994 Draft; 44 pages.
Zawinski, Jamie; Netscape—app-defaults file for Netscape 3.0b4; Aug. 1995; 74 pages.
File History of U.S. Pat. No. 7,631,191; 374 pages.
File History of U.S. Pat. No. 7,203,838; 360 pages.
Petition for Post-Grant Review (Covered Business Method Review) Under 35 U.S.C. § 321 and § 18 of the Leahy-Smith America Invents Act for U.S. Pat. No. 7,631,191 with Exhibits; Mar. 28, 2014; 1066 pages.
*PNC Bank, National Association, U.S. Bancorp, and U.S. Bank, National Association v. Secure Axcess, Lilac*; Declaration of Paul C. Clark; Mar. 28, 2014; 85 pages.
U.S. Appl. No. 60/153,004; 9 pages.
*Secure Axcess, LLC v. U.S. Bank National Association et al.*; Civil Action No. 6:13-CV-717; Defendants U.S. Bank National Association's and U.S. Bancorp's Amended Answer to Plaintiff's Original Complaint for Patent Infringement; May 5, 2014; 7 pages.
*Secure Axcess, LLC v. U.S. Bank National Association et al.*; Civil Action No. 6:13-CV-717; Defendants U.S. Bank National Association's and U.S. Bancorp's Answer to Plaintiff's Original Complaint for Patent Infringement; Apr. 14, 2014; 7 pages.
*Secure Axcess, LLC v. Ally Bank and Ally Financial Inc.*; Civil Action No. 6:13-CV-718; Answer to Original Complaint for Patent Infringement; Apr. 14, 2014; 8 pages.
*Secure Axcess, LLC v. Ally Bank and Ally Financial Inc. v. Fidelity Information Services, LLC and RSA Security LLC*; Civil Action No. 6:13-CV-718; Defendants Ally Bank's and Ally Financial, Inc.'s Third-Party Complaint Against Fidelity Information Services, LLC and RSA Security LLC; Apr. 28, 2014; 12 pages.
*Secure Axcess, LLC v. GE Capital Retail Bank, GE Capital Bank, General Electric Capital Corporation, and General Electric Company*; Civil Action No. 6:13-CV-720; Defendants' Answer, Affirmative Defenses, and Counterclaims to Plaintiffs Complaint for Patent Infringement; Apr. 14, 2014; 15 pages.
*Secure Axcess, LLC v. GE Capital Retail Bank, GE Capital Bank, General Electric Capital Corporation, and General Electric Company*; Civil Action No. 6:13-Cv-720; Secure Axcess LLC's Answer to GE Capital Retail Bank, GE Capital Bank, General Electric Capital Corporation, and General Electric Company's Counterclaims to Plaintiffs Complaint for Patent Infringement; May 5, 2014; 5 pages.
*Secure Axcess, LLC v. Nationwide Bank, Nationwide Financial Services, Inc., Nationwide Corporation, and Nationwide Mutual Insurance Company*; Civil Action No. 6:13-CV-721; Nationwide Bank, Nationwide Financial Services, Inc., Nationwide Corporation, and Nationwide Mutual Insurance Company's Answer to Plaintiffs Original Complaint for Patent Infringement; Apr. 14, 2014; 11 pages.

(56) References Cited

OTHER PUBLICATIONS

*Secure Axcess, LLC* v. *PNC Bank, National Association and The PNC Financial Services Group, inc.*; Civil Action No. 6:13-CV-722; Defendants PNC Bank, National Association and The PNC Financial Services Group, Inc.'s Answer to Plaintiffs Complaint; Apr. 14, 2014; 15 pages.
*Secure Axcess, LLC* v. *Santander Bank, N.A., f/k/a/ Sovereign Bank, National Association*; Civil Action No. 6:13-CV-723; Amended Complaint for Patent Infringement; Jan. 27, 2014; 8 pages.
*Secure Axcess, LLC* v. *Santander Bank, N.A., f/k/a/ Sovereign Bank, National Association*; Civil Action No. 6:13-CV-723; Defendant Santander Bank, N.A.'s Answer to Plaintiffs Amended Complaint for Patent Infringement; Apr. 14, 2014; 7 pages.
*Secure Axcess, LLC* v. *Vanguard Group, Inc. and Vanguard Marketing Corporation*; Civil Action No. 6:13-CV-724; Defendants The Vanguard Group, Inc. and Vanguard Marketing Corporation's Answer to Secure Axcess, LLC's Complaint; Apr. 14, 2014; 10 pages.
*Secure Axcess, LLC* v. *Vanguard Group, Inc. and Vanguard Marketing Corporation*; Civil Action No. 6:13-CV-724; Original Complaint for Patent Infringement; Sep. 27, 2013; 8 pages.
*Secure Axcess, LLC* v. *Bank of the West*; Civil Action No. 6:13-CV-779; Defendant Bank of the West's Answer to Plaintiff's Original Complaint for Patent Infringement; Apr. 14, 2014; 7 pages.
*Secure Axcess, LLC* v. *Cadence Bank, National Association*; Civil Action No. 6:13-CV-780; Defendant Cadence Bank, National Association's Answer and Defenses to Secure Axcess' Complaint for Patent Infringement; Apr. 14, 2014; 9 pages.
*Secure Axcess, LLC* v. *Charles Schwab Bank and The Charles Schwab Corporation*; Civil Action No. 6:13-CV-781; Charles Schwab Bank's and The Charles Schwab Corporation's Answer and Affirmative Defenses to Plaintiff Secure Axcess, LLC's Complaint; Apr. 21, 2014; 7 pages.
*Secure Axcess, LLC* v. *Charles Schwab Bank and The Charles Schwab Corporation*; Civil Action No. 6:13-CV-781; Original Complaint for Patent Infringement; Oct. 16, 2013; 8 pages.
*Secure Axcess, LLC* v. *Commerce Bank and Commerce Bancshares, Inc.*; Civil Action No. 6:13-CV-782; Defendants Answer, Affirmative Defenses, and Counterclaims; Apr. 14, 2014; 10 pages.
*Secure Axcess, LLC* v. *Commerce Bank and Commerce Bancshares, Inc.*; Civil Action No. 6:13-CV-782; Secure Axcess LLC's Answer to Commerce Bancshares Inc. And ornrnerce Bank's Counterclaims to Plaintiff's Complaint for Patent Infringement; May 5, 2014; 5 pages.
*Secure Axcess, LLC* v. *Ocwen Financial Corporation*; Civil Action No. 6:13-CV-783; Defendant Ocwen Financial Corporation's Answer to Plaintiffs Original Complaint for Patent Infringement; May 14, 2014; 9 pages.
*Secure Axcess, LLC* v. *Ocwen Financial Corporation*; Civil Action No. 6:13-CV-783; Original Complaint for Patent Infringement; Oct. 16, 2013; 7 pages.
*Secure Axcess, LLC* v. *Orange Savings Bank, SSB, First Financial Bank National Association, and First Financial Bankshares, Inc.*; Civil Action No. 6:13-CV-784; Defendants' Answer to Plaintiffs Original Complaint for Patent Infringement and Counterclaims; Apr. 14, 2014; 9 pages.
*Secure Axcess, LLC* v. *Orange Savings Bank, SSB, First Financial Bank National Association, and First Financial Bankshares, Inc.*; Civil Action No. 6:13-CV-784; Original Complaint for Patent Infringement; Oct. 16, 2013; 8 pages.
*Secure Axcess, LLC* v. *Orange Savings Bank, SSB, First Financial Bank National Association, and First Financial Bankshares, Inc.*; Civil Action No. 6:13-CV-784; Secure Axcess LLC's Answer to Orange Savings Bank, SSB, First Financial Bankshares, Inc. and First Financial Bank, National Association's Counterclaims to Plaintiffs Complaint for Patent Infringement; May 5, 2014; 6 pages.
*Secure Axcess, LLC* v. *Raymond James & Associates, Inc. and Raymond James Financial, Inc.*; Civil Action No. 6:13-CV-785; Answer to Original Complaint for Patent Infringement; Apr. 14, 2014; 8 pages.

*Secure Axcess, LLC* v. *Texas Capital Bank, N.A. and Texas Capital Bancshares, Inc.*; Civil Action No. 6:13-CV-786; Original Complaint for Patent Infringement; Oct. 16, 2013; 8 pages.
*Secure Axcess, LLC* v. *T. Rowe Price Investment Services, Inc., T. Rowe Price Associates, Inc., and T. Rowe Price Group, Inc.*; Civil Action No. 6:13-CV-787; Defendants' Answer to Original Complaint for Patent Infringement; Apr. 14, 2014; 7 pages.
*Secure Axcess, LLC* v. *T. Rowe Price Investment Services, Inc., T. Rowe Price Associates, Inc., and T. Rowe Price Group, Inc.*; Civil Action No. 6:13-CV-787; Original Complaint for Patent Infringement; Oct. 16, 2013; 8 pages.
*Secure Axcess, LLC* v. *Trustmark National Bank and Trustmark Corporation*; Civil Action No. 6:13-CV-788; Motion of Defendants Trustmark National Bank and Trustmark Corporation to Dismiss Trustmark Corporation for Lack of Personal Jurisdiction and Improper Venue and to Dismiss Trustmark National Bank for Improper Venue and Memorandum in Support; Apr. 14, 2014; 22 pages.
Final Written Decision; CBM2015-00027; Entered Jun. 13, 2016; 79 pages.
Oral Hearing Held on Wednesday, May 20, 2015; IPR2014-00475; entered Jul. 30, 2015; 84 pages.
Final Written Decision; IPR2014-00475; entered Sep. 8, 2015; 71 pages.
Oral Hearing Held on Wednesday, May 20, 2015; CBM2014-00100; entered Jul. 30, 2015; 63 pages.
Final Written Decision; CBM2014-00100; entered Sep. 8, 2015; 73 pages.
Final Written Decision; CBM2015-00009; entered Sep. 8, 2015; 73 pages.
Decision—Institution of Covered Business Method Patent Review; CBM2015-00027; entered Jun. 22, 2015; 45 pages.
Deposition of Bruce Schneier; CBM2015-00027; Aug. 11, 2015; 79 pages.
Patent Owner Secure Axcess, LLC's Patent Owner Response; CBM2015-00027; Sep. 14, 2015; 84 pages.
Declaration of Dr. Jonathan Katz; Exhibit 2008; CBM2015-00027; Sep. 13, 2015; 27 pages.
Petitioner's Reply to Patent Owner's Response (with exhibits); CBM2015-00027; Dec. 3, 2015; 487 pages.
Declaration of Kendyl A. Roman; CBM2015-00027; Dec. 3, 2015; 59 pages.
Patent Owner Secure Axcess, LLC's Observations on Cross-Examination of Mr. Roman; CBM2015-00027; Jan. 25, 2016; 11 pages.
Deposition of Kendyl A. Roman; CBM2015-00027; Jan. 6, 2016; 74 pages.
Petitioner's Response to Patent Owner's Motion for Observations on Cross-Examination; CBM2015-00027; Feb. 8, 2016; 10 pages.
The American Heritage College Dictionary, Third edition; "Ems to encephalitis laethargica" and "transfer factor to transition"; 1997; 4 pages.
The American Heritage Dictionary, Third Edition; "figurine to fils" p. 315; 1994; 2 pages.
Bach, Maurice J.; The Design of the UNIX Operating System; 1986; 10 pages.
Blakley, Bob; COBRA Security, An Introduction to Safe Computing with Objects; 2000; 11 pages.
Component Software; White Paper; Dec. 5, 1994; 17 pages.
Cyberdog General FAQ; 1996; 7 pages.
Dictionary of Computing, Fourth Edition; 1996; 7 pages.
Encyclopedia of Computer Science, Fourth Edition; 2000; 7 pages.
Encyclopedia of Computer Science, Third Edition; 1993; 5 pages.
Lo, Vincent; "Getting Started With OpenDoc Storage;" 1996; 14 pages.
Macintosh Programming Fundamentals; undated; 5 pages.
Merriam-Webster's Collegiate Dictionary, Tenth Edition; p. 434 "fifth to file;" 1996; 3 pages.
Microsoft Computer Dictionary, Fourth Edition; 1999; 10 pages.
OpenDoc for Macintosh, An Overview for Developers; Dec. 1994; 21 pages.
The Oxford American Dictionary and Language Guide; filariasis through filter; 1999; 4 pages.

(56) References Cited

OTHER PUBLICATIONS

Opening Brief of Appellant Secure Axcess, LLC; *Secure Axcess, LLC v. PNC Bank National Association et al.*; United States Court of Appeals for the Federal Circuit; On Appeal from the United States Patent and Trademark Office, Patent Trial and Appeal Board in No. CBM2014-00100; Case No. 06-1353; Filed Feb. 19, 2016; 170 pages.

Brief for Appellees; *Secure Axcess, LLC v. PNC Bank National Association et al.*; United States Court of Appeals for the Federal Circuit; On Appeal from the United States Patent and Trademark Office, Patent Trial and Appeal Board in No. CBM2014-00100; Case No. 06-1353; Document No. 77; Filed May 4, 2016; 86 pages.

Corrected Reply Brief of Appellant Secure Axcess, LLC; *Secure Axcess, LLC v. PNC Bank National Association et al.*; United States Court of Appeals for the Federal Circuit; On Appeal from the United States Patent and Trademark Office, Patent Trial and Appeal Board in No. CBM2014-00100; Case No. 06-1353; Document No. 86; Filed Jun. 6, 2016; 41 pages.

Opening Brief of Appellant Secure Axcess, LLC; *Secure Axcess, LLC v. EMC Corporation, RSA Security LLC*; United States Court of Appeals for the Federal Circuit; On Appeal from the United States Patent and Trademark Office, Patent Trial and Appeal Board in No. IPR2014-00475; Case No. 06-1354; Filed Feb. 19, 2016, 2016; 153 pages.

Brief for Appellees EMC Corporation and RSA Security LLC; *Secure Axcess, LLC v. EMC Corporation, RSA Security LLC*; United States Court of Appeals for the Federal Circuit; On Appeal from the United States Patent and Trademark Office, Patent Trial and Appeal Board in No. IPR2014-00475; Case No. 06-1354; Document No. 29; Filed May 4, 2016; 59 pages.

Reply Brief of Appellant Secure Axcess, LLC; *Secure Axcess, LLC v. EMC Corporation, RSA Security LLC*; United States Court of Appeals for the Federal Circuit; On Appeal from the United States Patent and Trademark Office, Patent Trial and Appeal Board in No. IPR2014-00475; Case No. 06-1354; Document No. 34; Filed Jun. 6, 2016; 22 pages.

Record of Oral Hearing; CBM2015-00027; Oral Hearing Held Mar. 15, 2016; Jun. 6, 2016; 66 pages.

Decision Denying Institution of Covered Business Method Patent Review; CBM2015-00039; entered Jul. 10, 2015; 21 pages.

*Secure Axcess, LLC vs. PNC Bank National Association et al.*; Federal Circuit Case No. 2016-1353; Decision; Appeal from PTAB in CBM2014-00100; Feb. 21, 2017; 29 pages.

*Secure Axcess, LLC vs. PNC Bank National Association et al.*; Federal Circuit Case No. 2016-1353; Order on Petitions for Rehearing En Banc; Appeal from PTAB in CBM2014-00100; Jun. 6, 2017; 40 pages.

*Secure Axcess, LLC vs. PNC Bank National Association et al.*; Federal Circuit Case No. 2016-1354; Judgment; Appeal from PTAB in IPR2014-00475; Feb. 21, 2017; 2 pages.

\* cited by examiner

```
<OBJECT ID="Checker" CLASSID="CLSID:B2157787-7492-11D4-8296-
00609430A416"
CODEBASE="APge.dll"
SIGN="Tud9LuaH9v5QMQcHGUAmtDNhvZ3nGtUEHUMiGIsORV8v7JF9fp
IBiq3Jod0SvdCqQxq+4DzXc
SDK+5r6dbpJMTKiZQWLJpwNJuJSS+cfywEXdQHxcOpRt8Hryi833Bg41s
AIT+SCg5j7DBIzsvIVwohe
chGYv5476AOavkoJrD4="></OBJECT>
```

FIG. 11

AUTHENTICATING ELECTRONIC CONTENT

CROSS-REFERENCE TO RELATED APPLICATIONS

This application is a continuation-in-part of U.S. Ser. No. 09/656,074 filed Sep. 6, 2000 and entitled "System and Method for Authenticating a Web Page", which itself claims priority to U.S. Provisional Application Ser. No. 60/153,004, filed Sep. 9, 1999 and entitled "Enhanced Browser Security System", all of which are hereby incorporated by reference.

FIELD OF INVENTION

The present invention relates generally to computer security, and more particularly, to systems and methods for authenticating web pages and email messages.

BACKGROUND OF INVENTION

Web pages often include icons, such as, corporate logos, patterns, characters, symbols or other indicators, that a user associates with a particular offering in the real world. A trust or good will is often associated with the recognition of a given set of icons. These icons are implemented, for example, as bitmaps, but unfortunately, these bitmaps can be copied and used to defraud a prospective consumer. Additionally, consumers rely on the accuracy of a URL of a web page. However, it is relatively easy for a "fraudster" to register a URL that is like the one the user is expecting, but is not quite the same. For example, "www.bigbank.com" vs. "www.blgbank.com" (with an "I" instead of an "i"). Thus, a user may retrieve an unwanted webpage that appears authentic. Therefore, the user may not always be confident that the web page being viewed is authentic and the true owner of a web page may be uncertain.

Another growing problem relating to the Internet is fraudulent use of email for the purpose of identity theft. Legitimate organizations often use email to communicate with members or to solicit prospects. For example, a financial institution may send information relating to a credit account to a borrower. This information may include payment reminders, offers for credit, promotions, account statements, applications, etc. An identity theft may include sending an email which includes a return address very similar to the legitimate organization. The body of the email may contain identifying features such as logos that make the email appear to be legitimate. A common email scam employed by identity thieves is to, for example, send an email to a credit account holder stating that for security purposes, the holder must verify their social security number and account number, otherwise their account will be canceled. The email body may request that the consumer provide the requested information in a return email or may contain a URL linking to a fraudulent web page (as previously described) where the consumer may be prompted to enter personal information.

In addition to a consumer's lack of confidence in the true owner of a web page or the sender of an email, there currently exists a problem (either real or perceived) in the transport of personal information across the Internet. While most web sites provide security by, for example, using a secure protocol such as Secure Hypertext Transfer Protocol (HTTPS) for sensitive data, most consumers are complacent about checking for this security. Moreover, there is currently no technology to ensure that only email messages from legitimate senders are delivered to a consumer's email address. Thus, a need exists for a system and method that allow a page and/or an email message to be authenticated so that a consumer feels secure in the authenticity of pages displayed from Internet sites and email messages received from an organization.

SUMMARY OF INVENTION

In exemplary embodiments of the invention, a user requests a web page from a web site using a web browser. The web server receives the request, retrieves the web page and forwards it to an authentication server. The authentication server inserts an authenticity key into the web page, then the page (including the authenticity key) is returned to the user. If the page includes an authenticity key, the authenticity is verified at the user's computer because the user computer includes logic (e.g., software) to verify the authenticity.

In exemplary embodiments, the authenticity verification software is a browser plug-in and is configured by the user after it is downloaded to the user's computer. During the user configuration process, the user defines an authenticity stamp, which determines the format of an authenticated page. In alternative embodiments, the user defines a non-authenticity stamp, which will appear on non-authenticated pages.

In another embodiment, the authenticity of an email message is ensured by including dynamic information within the message which is only known between the recipient and the sending entity. Dynamic information may include, for example, information such as an account balance, last deposit date, previous transaction amount and the like. Dynamic information should not be confused with static information which is often used to verify the identity of a caller or originator of an email message. Static information does not change, therefore does not offer the same level of assurance as provided by dynamic information. Static information may include, mother's maiden name, a pre-selected word or phrase, pets name, a birth date, etc. In one embodiment, the invention may combine dynamic information with static information to create an additional layer of assurance of authenticity.

In yet another embodiment, the invention includes generation of a unique fractal design to be included within the body of an email message. Fractals can be generated from a stored algorithm thereby enabling a consumer to visually determine that an email message is from the legitimate source. Fractals are nearly impossible to duplicate by any means other than the algorithm used to create it. The invention includes a method for inserting an authenticity marker into data at a server by: receiving a data request from a client for the data; retrieving the data based on the data request; generating the authenticity marker (e.g., generating a fractal using CGI) from an algorithm; upon retrieving the data, formatting the data in real-time at the server, wherein the formatting step includes inserting the authenticity marker into the data; and, returning the formatted data to the client.

BRIEF DESCRIPTION OF THE DRAWINGS

The above and other features and advantages of the present invention are hereinafter described in the following detailed description of illustrative embodiments to be read in conjunction with the accompanying drawing figures, wherein like reference numerals are used to identify the same or similar parts in the similar views, and:

FIG. 11 is an exemplary authenticity key in accordance with the present invention.

DETAILED DESCRIPTION

The present invention provides for an icon with an additional level of functionality that allows a user to validate that current information (e.g., a web page) originates from the true owner of the icon and is not merely a copy. In various exemplary embodiments of the invention, a hierarchy of validations exists which allow not only for the validation of an individual icon, but also for the validation of screens and Uniform Resource Locators (URLs). Unlike Secure Sockets Layer (SSL) or other "security session" protocols, the present invention validates aspects of the screen display independent of the communications channel between the user and the web site (however, security session protocols may be used in addition to the present invention). The validation is performed using only information that the true owner of the icon can possess.

The various embodiments of the invention may be employed within web pages, email messages or a combination thereof. Those skilled in the art will appreciate that most email viewers today support markup language conventions in order to display images and text within a pre-defined layout. As such, the authentication methods disclosed herein are equally applicable to both web page display within a browser application and to email messages displayed with a browser application and/or an email viewing application. For simplicity, the term "content" as used herein should be understood to encompass any digital data content known in the art including HTML, XML, JavaScript, VBScript, Applets, ASCII text, graphics, multimedia, etc. all of which can be used alone or in combination to produce a web page or email message. Therefore, it should be appreciated that the frequent reference is made to add authentication to web pages, the various embodiments may also be employed to add authentication to email messages.

Figure 1:
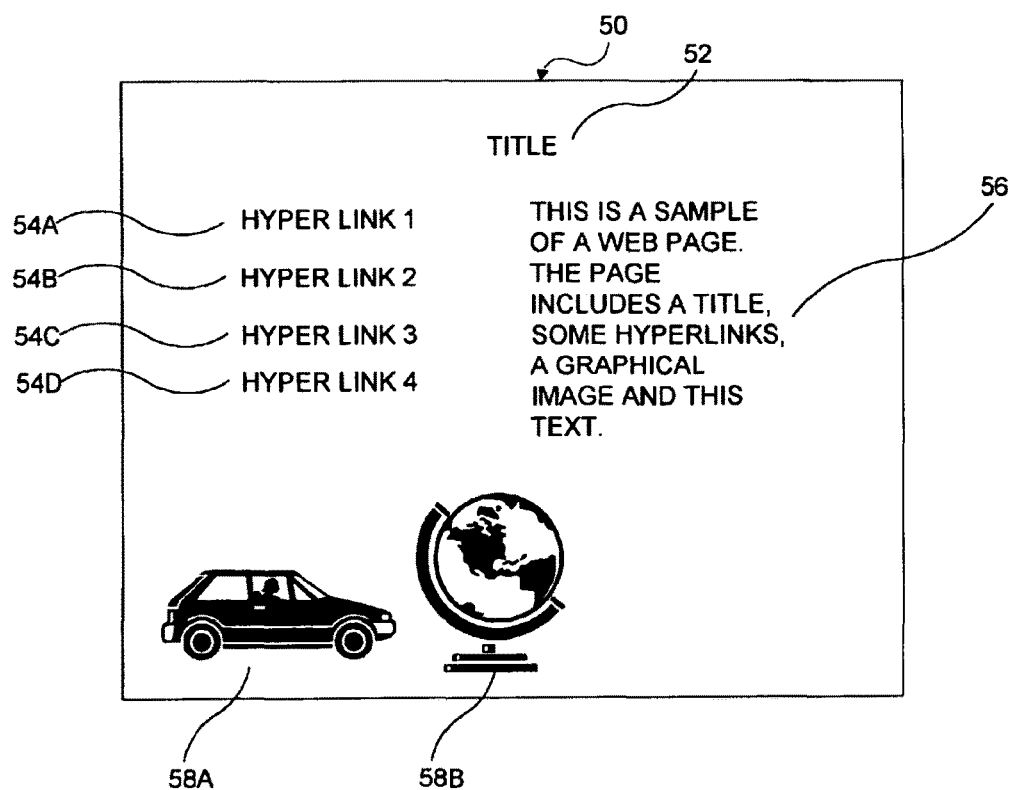
FIG. 1 is an exemplary web page that has not been authenticated.

FIG. 1 is an example of simple content in the form of a web page. The web page 50 includes a title 52, several hyperlinks 54A, 54B, 54C and 54D, some textual information 56 and two graphical images 58A and 58B.

Figure 2:
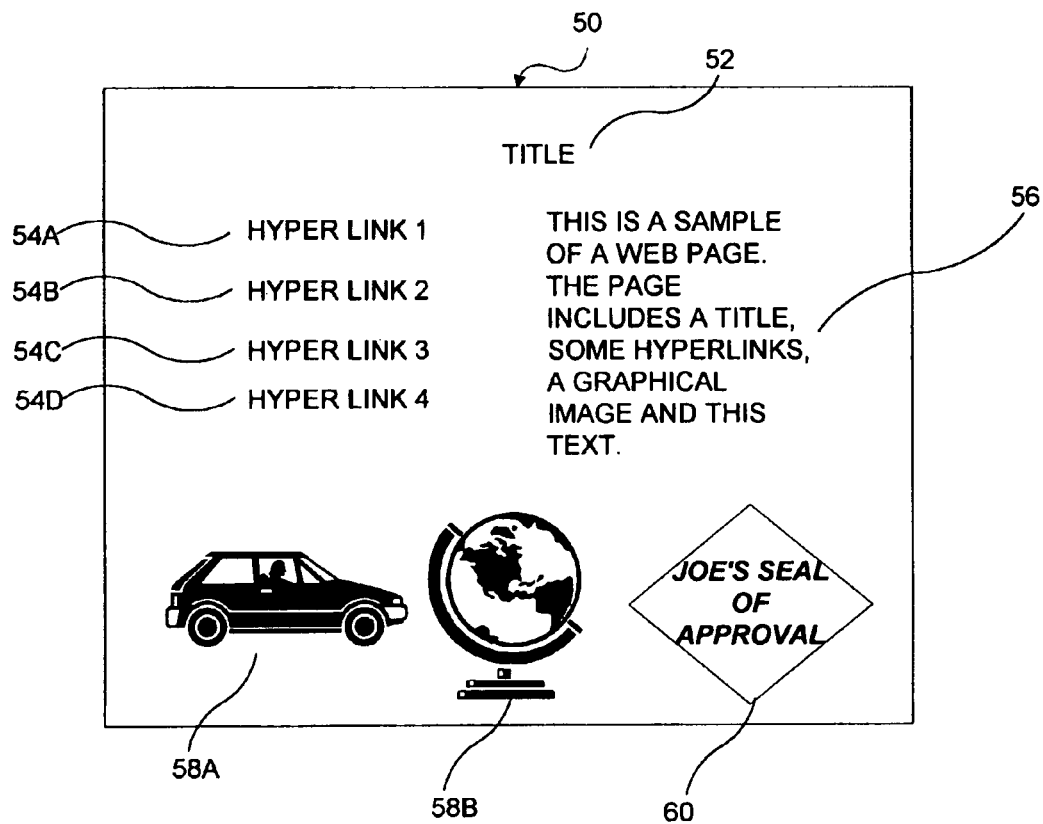
FIG. 2 is the exemplary web page of FIG. 1 that has been authenticated in accordance with the present invention.

A web page that has been authenticated using the present invention will include all of the information in the same format as the non-authenticated page. As shown in FIG. 2, in addition to the information that would normally be displayed, an authenticated page includes an authenticity stamp 60 in which the user can specify the appearance of the authenticity stamp. For example, the user of the example shown in FIG. 2 defined the authenticity stamps to be a diamond shape, which includes text (bold and italicized) that states "JOE'S SEAL OF APPROVAL." It will be appreciated that an unlimited number of variations of an authenticity stamp are possible. A user can configure the stamp to be graphics only, text only or a combination thereof. The user also specifies the color and other attributes of the stamp, for example, a blinking stamp. The user also specifies the location of the stamp, e.g., bottom right corner of the web page, pop-up dialog box, etc. In exemplary embodiments, the authenticity stamp can be audio instead of or in addition to visual. In alternative embodiments, a non-authenticated page is stamped and an authenticated page is not stamped. For example, the stamp is configured to be a red, flashing icon that reads "PAGE NOT AUTHENTICATED" in the upper right-hand corner, while a page that is authenticated does not include this stamp. In alternative examples, the user can define both an authenticity stamp and a non-authenticity stamp.

Figure 3:
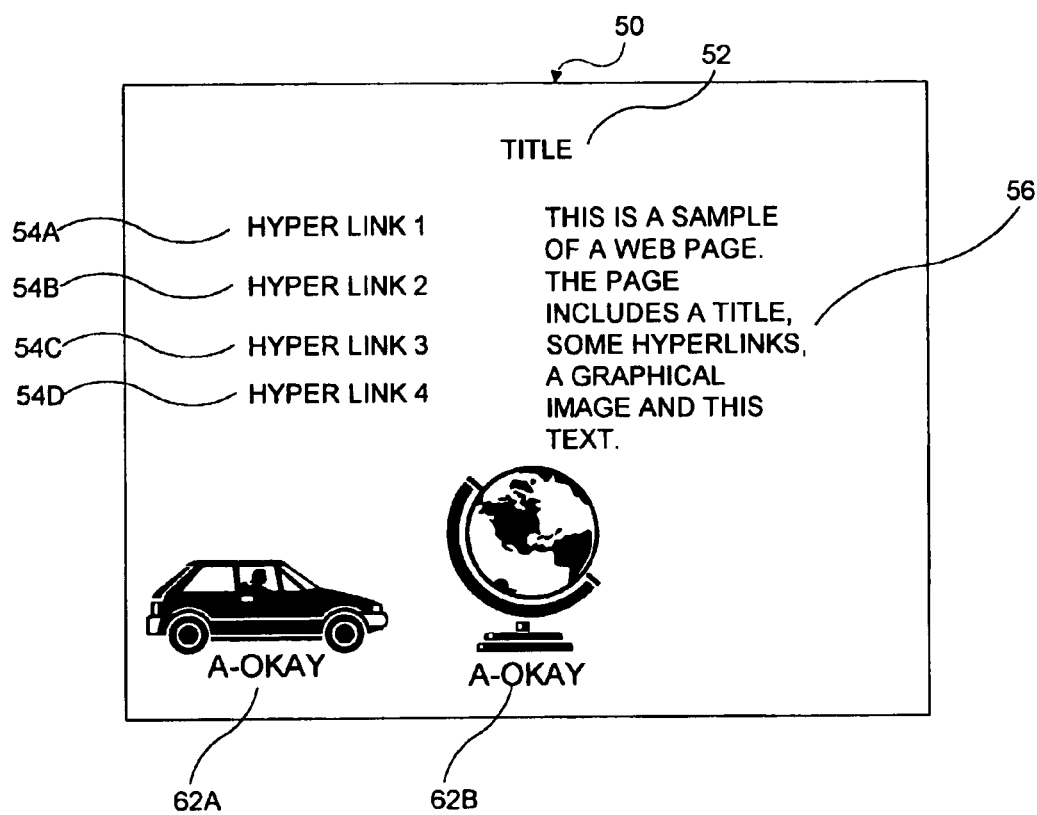
FIG. 3 is the exemplary web page of FIG. 1 that has been authenticated using an alternative embodiment of the present invention.

FIG. 3 illustrates an alternative embodiment wherein each graphical image includes an embedded authenticity stamp 62A and 62B. In the example illustrated in FIG. 3, each graphical element has an authenticity stamp containing the text "A-OKAY" embedded in the graphical image. In exemplary embodiments, the authenticity stamp is defined by the user. In other embodiments, the authenticity stamp is defined by the owner of the page being displayed (e.g., the web server). In such embodiments, the stamp can include the name of the trusted entity (i.e., the true owner of the page).

In another embodiment, the stamp is a computer-generated fractal design. Computer-generated fractals are images corresponding to mathematical equations, that repeat self-similar patterns at infinitely receding levels of organization. Due to the complexity of fractal patterns, it is virtually impossible to duplicate without having access to the mathematical equation used to create it. Although fractal designs can be very complex, the general appearance of the design is fairly simple to memorize in much the same manner that a signature is quickly identifiable by a person who has had even minimal contact with the signer.

A computer generated fractal may also be preferred to a stored graphic (e.g. bitmap, jpeg, gif) in that it can be stored as a mathematical equation which would occupy far less storage space. When a consumer requests content, a server will retrieve the unique equation corresponding to the identified user and invoke an application to dynamically construct a fractal from the equation. The fractal may then be appended to the content where it will be visible to the user.

In still another embodiment, the stamp comprises personal information relating to the user's account. This information is known only by the sender and the recipient of an email message and/or web page and may comprise any portion of information relating to the relationship between the recipient and sender. For example, a financial institution may create a stamp that includes the card member's last payment date, amount of last transaction, account balance and the like. A recipient receiving such a stamp would be able to easily verify whether the information in the stamp is accurate and therefore have confidence in the identity of the sender.

According to this embodiment, when an email is sent to a consumer, a unique consumer identifier is used to lookup account information from one or more of the sender's transactional databases. Specific pieces of this account information is then formatted and inserted into the body of the email message or HTML document. Transactional data includes, for example, date of last deposit, account balance, last payment amount, transfer amounts, prior purchase data, spending patterns, loyalty information, and the like. When the email is received, the consumer can verify the stamp to determine whether or not the information contained within the content is from a legitimate source.

Figure 4:
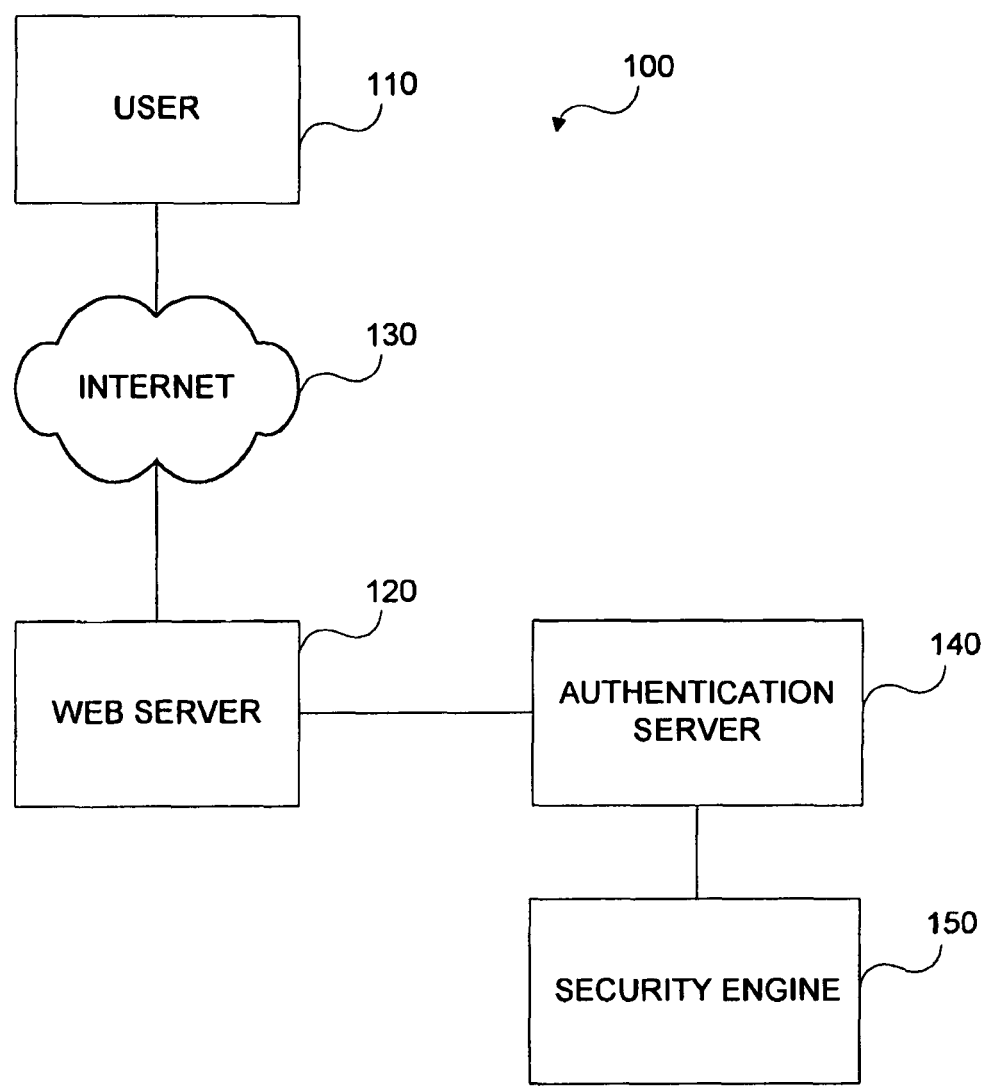
FIG. 4 is a block diagram of an exemplary system configuration suitable for implementing the present invention.

FIG. 4 is a block diagram of an exemplary environment 100 suitable for implementing the present invention. The system 100 includes one or more clients (e.g., users) 110 that communicate with one or more servers (e.g., web servers) 120. The users 110 can use any type of computing device that includes a display device, for example, a Personal Computer. It will be appreciated that other computing devices can be used, for example, a Personal Digital Assistant (PDA), a hand-held computing device, a cellular telephone, etc. The web server can be any site, for example a commercial web site, such as a merchant site, a government site, an educational site, etc. The user 110 establishes a connection to the web server 120 via a network 130, such as the Internet. The user 110 and web server 120 can communicate using a secure protocol (e.g., HTTPS) or a non-secure protocol (e.g., HTTP). The user 110 requests web page and/or email content from the web server 120, and in exemplary embodiments, the content is communicated using web pages, for example using HyperText Markup Language (HTML). The content is displayed on the user's computer 110, for example, using a browser, such as, Netscape Communicator available from the Netscape Corporation of Mountain View, Calif. or Internet Explorer available from the Microsoft Corporation of Redmond, Wash. Prior to sending the requested content to user 110, web server 120 submits the content to authentication server 140 where authenticating information is added. The content that includes the authenticating information is returned to the web server 120, which then sends the content including the authentication information to the user 110.

In various exemplary embodiments, the authentication server 140 communicates with a security engine 150, for example to verify UserID/Password logons or single use passwords or identifiers. In exemplary embodiments, the security engine 150 is a commercially available security engine, such a, Siteminder available from Netegrity Corporation, of Waltham, Mass.

The examples illustrated and described herein are directed to exemplary embodiments in which a user utilizes a web browser or email client to request content from a web server. However, it will be appreciated that various embodiments are possible wherein a client (e.g., web browser) requests content (e.g., a web page) from a server (e.g., a web server). The present invention allows the server to provide the client with assurance as to the authenticity of the content (e.g., assure the client as to the true owner of the content).

Figure 5:
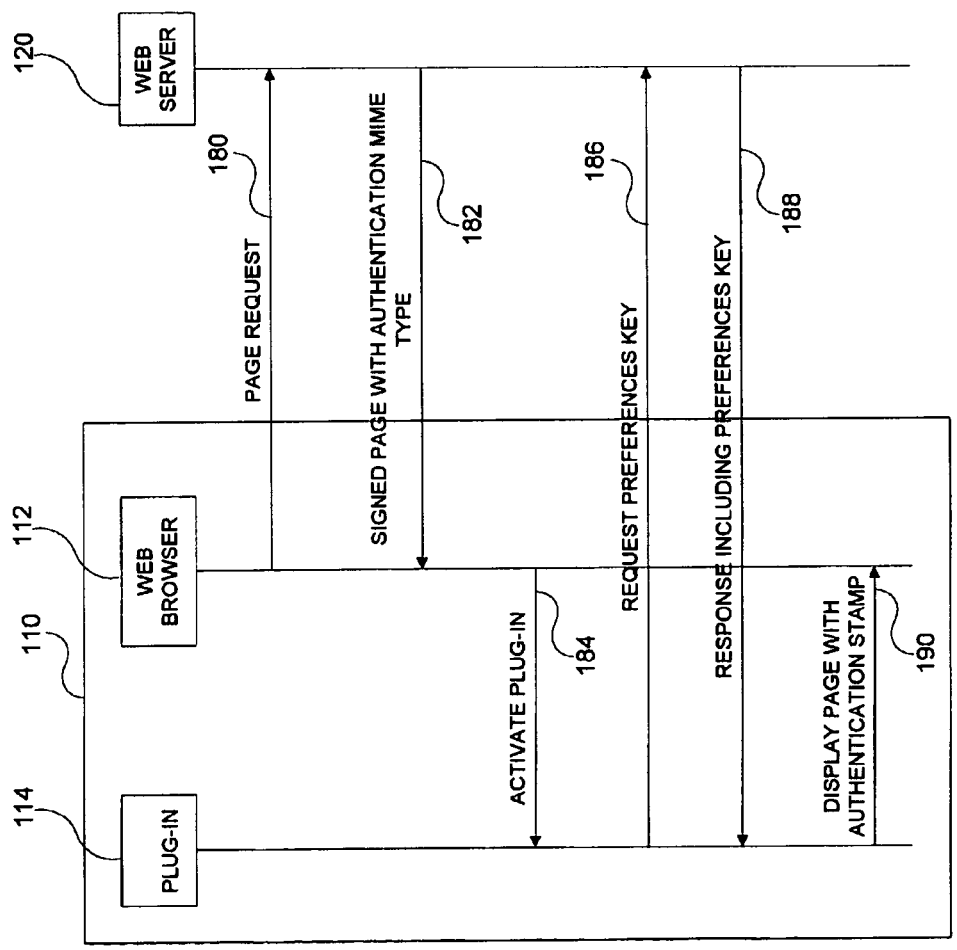
FIG. 5 is a message sequence diagram for performing page authentication in accordance with the present invention.

FIG. 5 is a message sequence diagram illustrating exemplary communications among various components to assure a user of the authenticity of a page. While FIG. 5 and the discussion thereof make frequent reference to a "web browser" and a "page", those skilled in the art will appreciate that those terms may be substituted with "email client" and "email" without departing from the scope of the invention.

User 110 includes a web browser 112 and a plug-in 114. A user requests a page 180, but the user (e.g., user computer) 110 has no knowledge that the page requested is "special" (e.g., is subject to page authentication). Thus, the page request 180 is a normal page request (e.g., a HTTP or HTTPS request for a page).

The web server 120 receiving the page request 180 determines whether the request is for an authenticated page. If the page is to be authenticated, the page is dynamically signed with a private key and additional information, such as a salt with a time stamp is also included as described in further detail later. The signed page is returned with a special authenticated page MIME type and returned to the web browser 112. Based on the MIME type, the web browser 112 activates the appropriate plug-in 114.

The plug-in 114 uses a public key to verify the signature, and upon verification of the signature, the plug-in can validate the authenticity of the page. The plug-in 114 requests the user's preferences key 186 so that the page can be displayed with an authenticity stamp. In exemplary embodiments, the request for preferences key includes a shared secret and is encrypted with the public key and salt. Upon receipt of the request for preferences key 186, the web server 120 decrypts the request using the private key, validates the shared secret and encrypts the preferences key with the private key, shared secret and salt from the request 186. The encrypted preferences key is then returned to the plug-in 114.

The plug-in 114 reads the preferences file and decrypts it using the preferences key from the web server 120. In exemplary embodiments, the preferences file is stored on the user's 110 file system. However, the location of the file is not readily known to the plug-in 114. Thus, the plug-in 114 must get the preferences key to determine the location of the preferences file. The plug-in 114 reads the preferences file to determine the authenticity stamp and how it is to be displayed. The page is then displayed with the user's preferred authenticity stamp 190.

Figure 7:
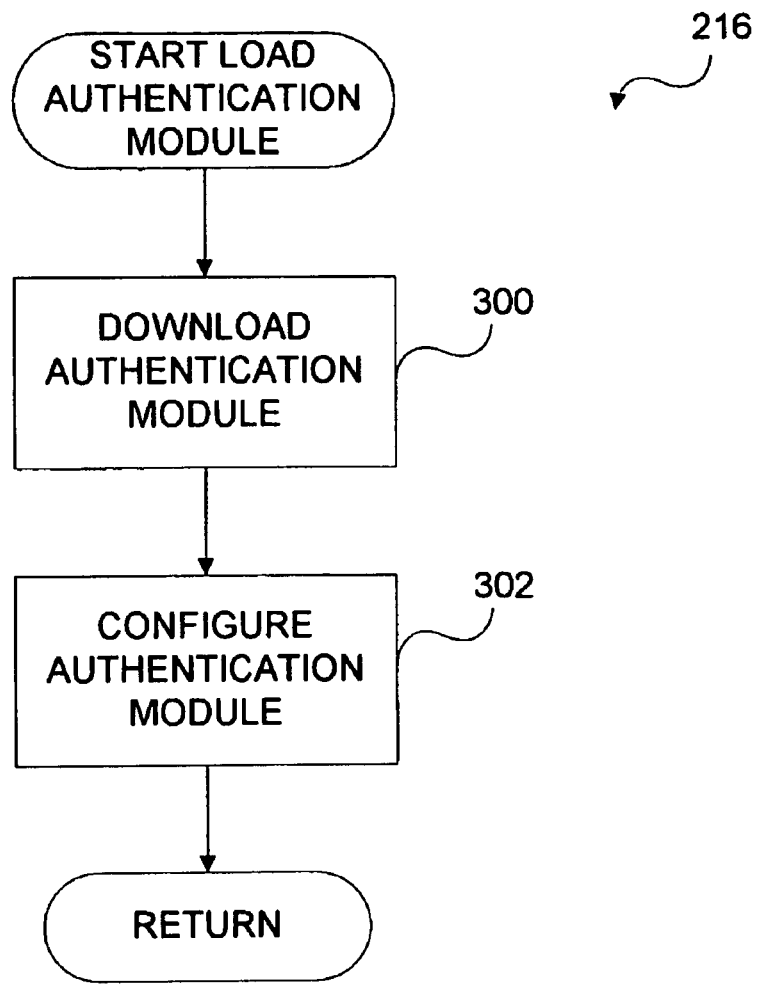
FIG. 7 is a flow diagram illustrating exemplary logic for loading an authentication module in accordance with the present invention.
Figure 8:
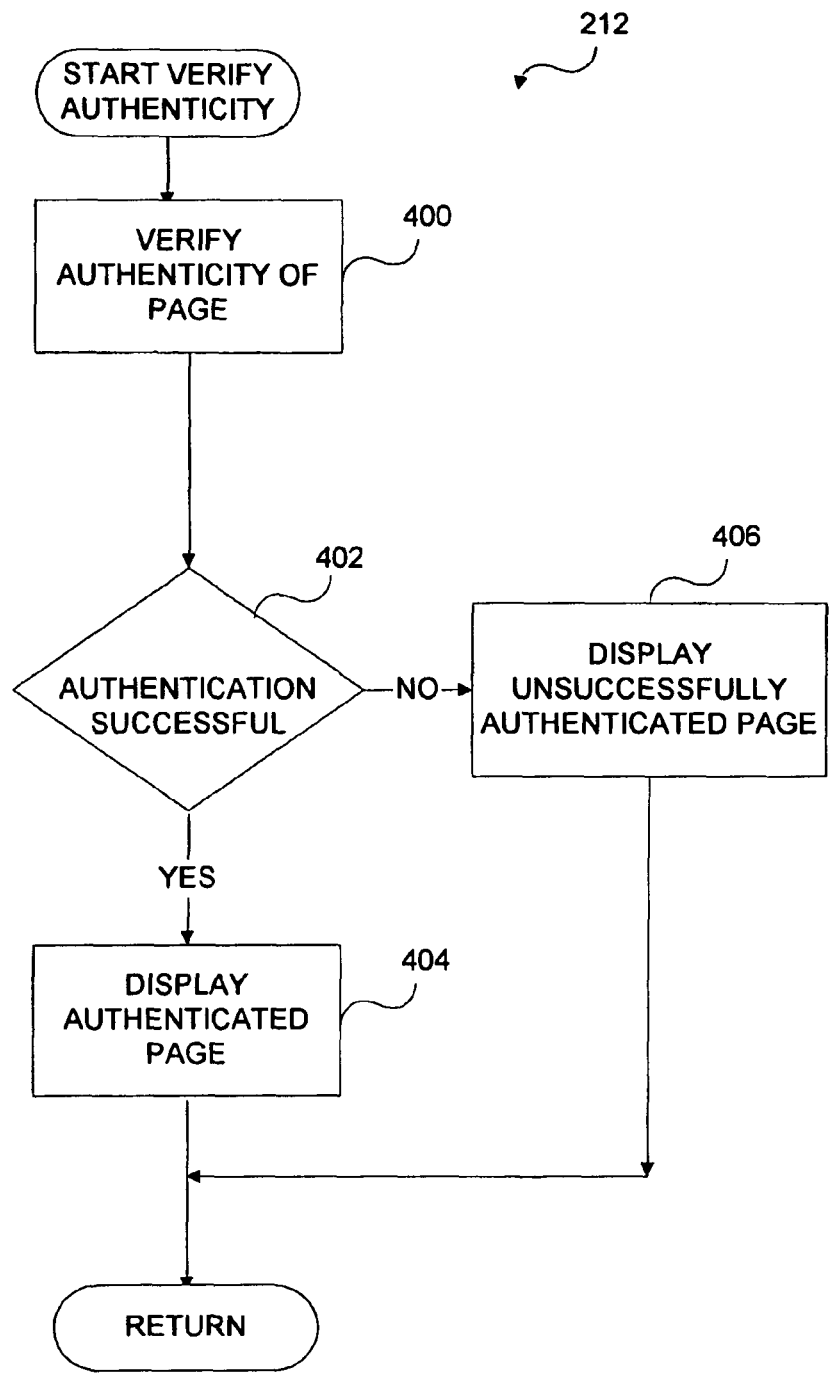
FIG. 8 is a flow diagram illustrating exemplary logic for verifying authenticity and displaying an authenticated page in accordance with the present invention.
Figure 9:
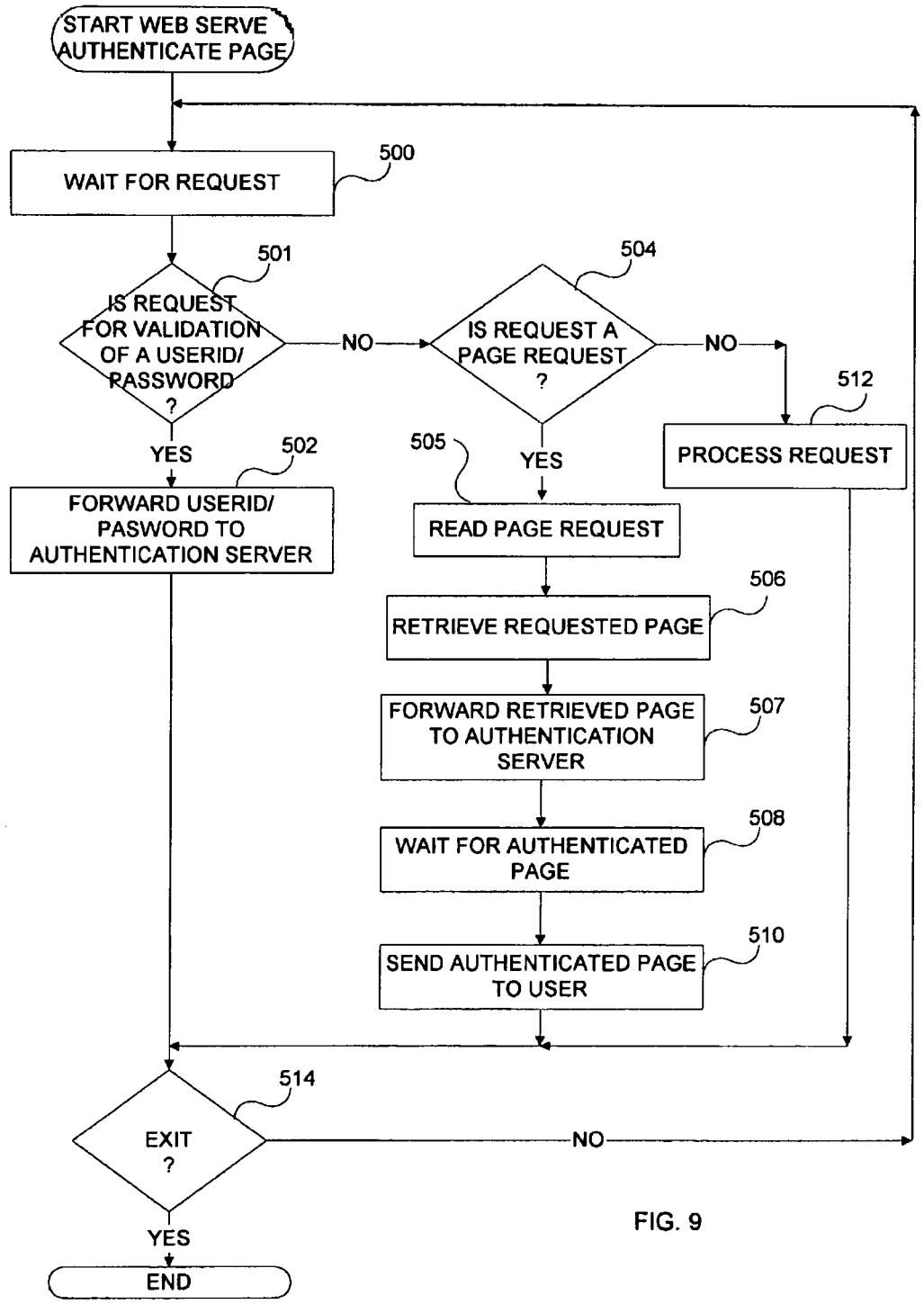
FIG. 9 is a flow diagram illustrating exemplary logic performed by a web server for performing authentication in accordance with the present invention.
Figure 10:
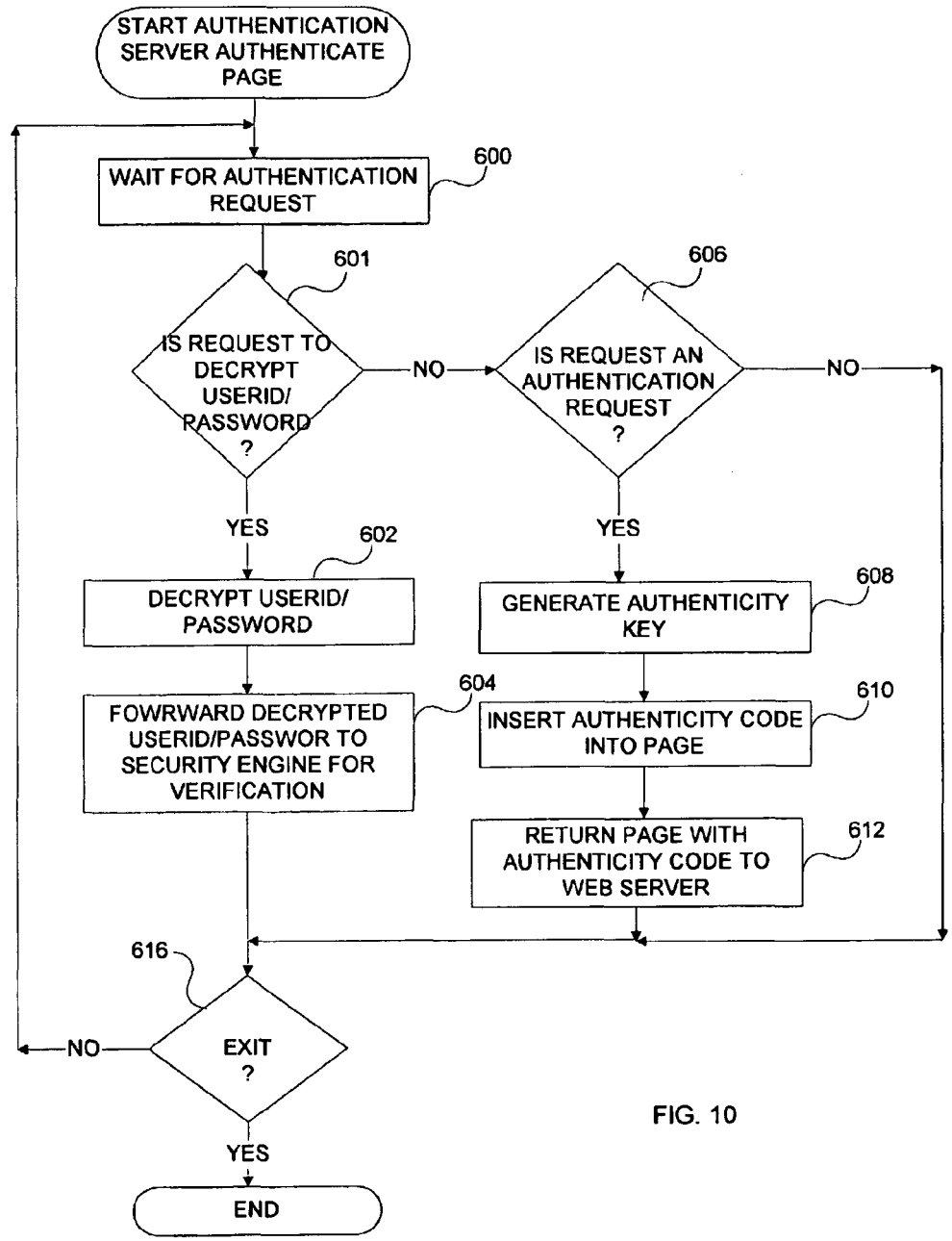
FIG. 10 is a flow diagram illustrating exemplary logic performed by an authentication server in accordance with the present invention.

FIGS. 6A-10 illustrate exemplary logic for performing page authentication in accordance with the present invention. The flow diagrams illustrate in further detail the logic illustrated in the message sequence diagram of FIG. 5. In addition to authenticating a page, the present invention provides for additional security wherein a UserID/Password are encrypted with the public key to prevent "man in the middle" attacks. FIGS. 6A-8 illustrate exemplary logic performed by a user computer 110 as described below. FIG. 9 illustrates exemplary logic performed by a web server 120 as described below. FIG. 10 illustrates exemplary logic performed by an authentication server 140 as described below. It will be appreciated that various configurations are possible. For example, the logic of the authentication server 140 can be combined with the logic of the web server 120.

Figure 6A:
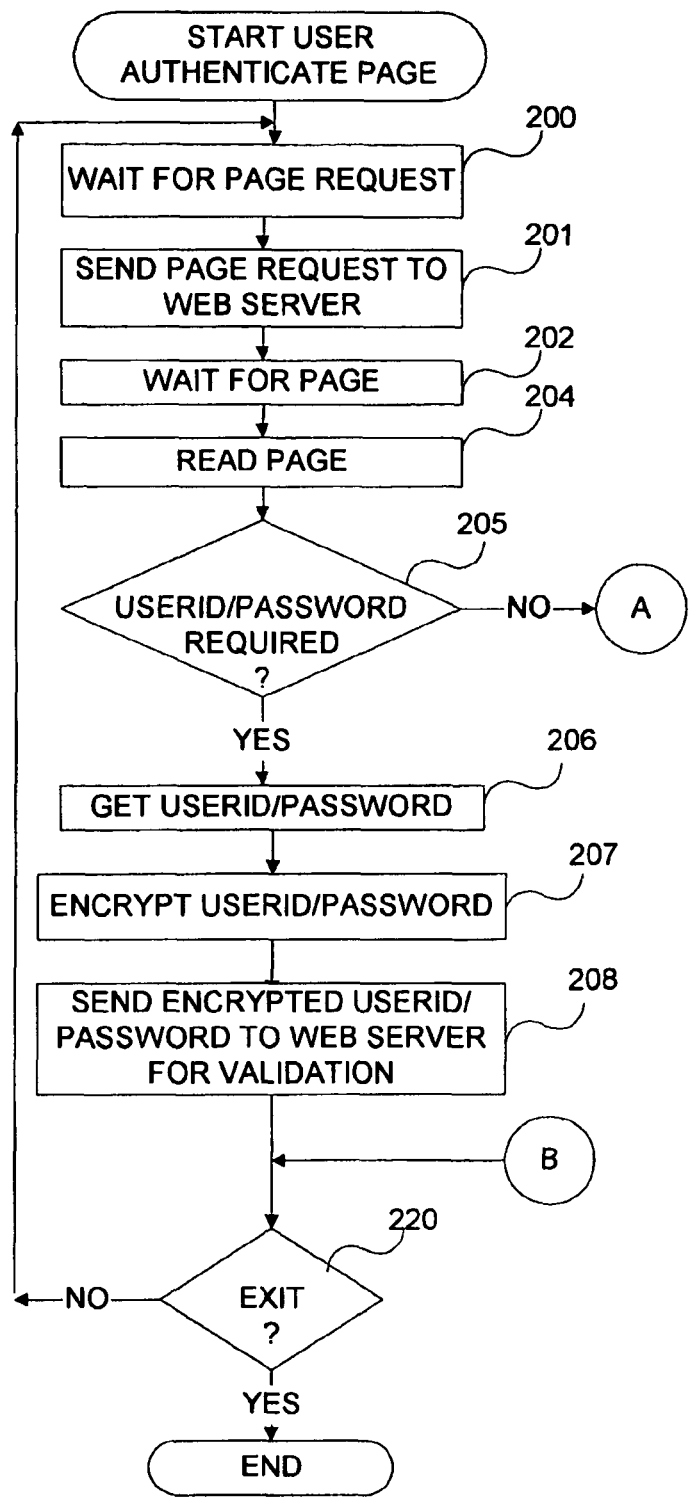
FIGS. 6A and 6B are a flow diagram illustrating exemplary logic performed by a user computer for performing authentication in accordance with the present invention.
Figure 6B:
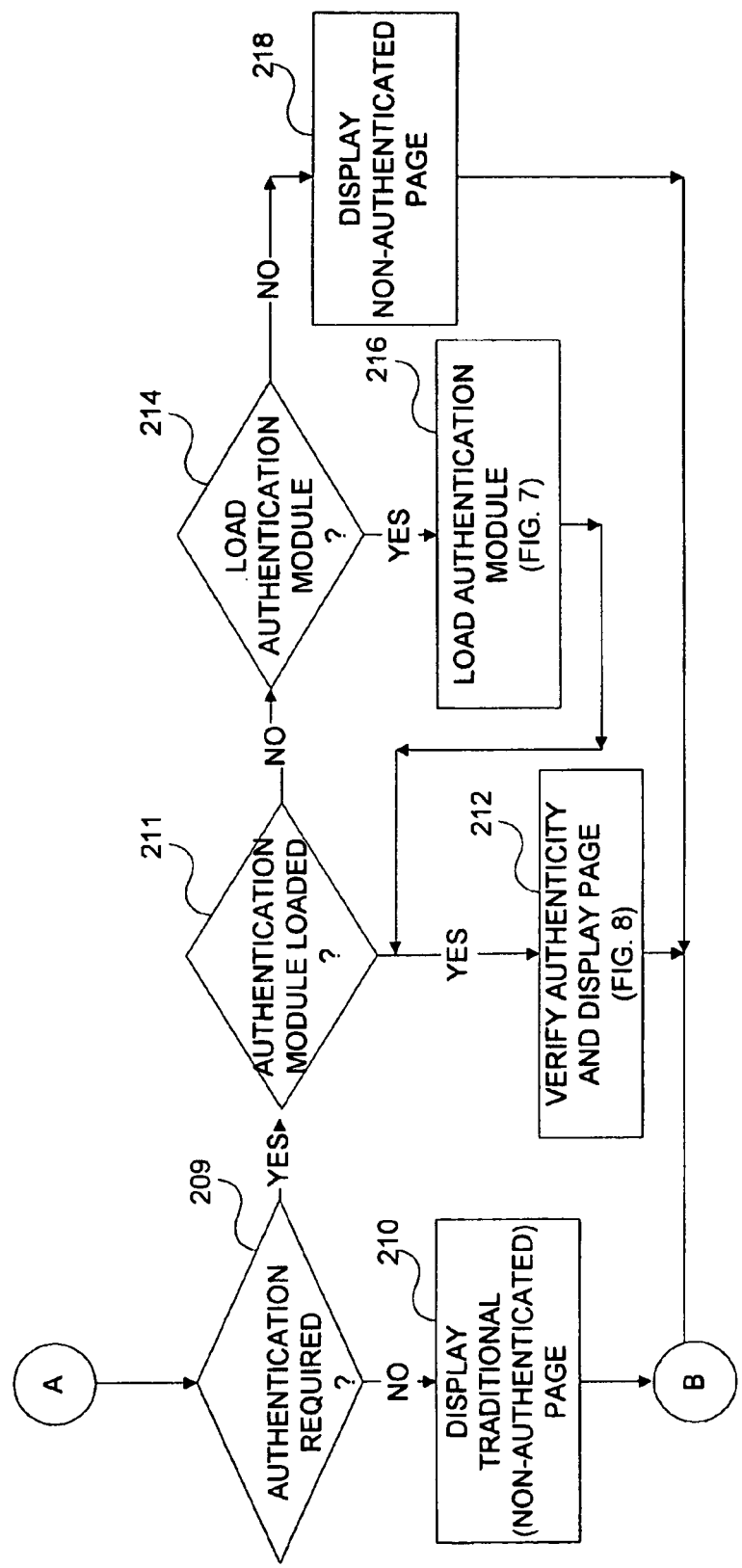

FIGS. 6A and 6B are a flow diagram illustrating exemplary logic performed by a user 110 for performing authentication in accordance with the present invention. The logic described herein is directed to web pages, however it will be appreciated that the information requested can be of various formats. The logic of FIG. 6A moves from a start block to block 200 to wait for a page request. It will be appreciated that a page request is known in the art, for example, a user enters a Uniform Resource Locator (URL) or clicks on a hyperlink. The logic then moves to block 201 where a received page request is sent to a web Server 120 to retrieve the requested page. The logic then moves to block 202 where the user (e.g., the user's browser) waits for the requested page. The logic of retrieving and formatting the requested page is described below with reference to FIGS. 9 and 10. When the requested page is received, the logic moves to block 204 where the page is read.

After a page is read, the logic moves to decision block 205 where a test is made to determine if a UserID/Password is required. It will be appreciated that a UserID/Password may be required for both pages requiring authentication and pages not requiring authentication. If a UserID/Password is required, the logic moves to block 206 where a UserID/Password is obtained. If a UserID/Password is required, a suitable logon screen is displayed on the user's computer. The UserID/Password entry display can be of varying formats, for example, a web page or a pop-up dialog box. Upon entry of a UserID/Password, the user indicates completion (for example, by pressing an "OK" or "Submit" button). Upon completion of the logon, the logic moves to block 207 where the UserID/Password is encrypted to prevent man in the middle attacks. The logic then moves to block 208 where the encrypted UserID/Password is sent to the web Server.

If a UserID/Password is not required, the logic moves to decision block 209 (FIG. 6B) where a test is made to determine if authentication is required. In exemplary embodiments, an authenticity key will be hidden in any page that should be authenticated. In order to determine if the page should be authenticated, the page source is read to determine if an authenticity key is included in the page. If authentication is not required, the logic moves to block 210 where the non-authenticated page is displayed. A non-authenticated page is a traditional web page (i.e., the way the web page would be displayed without the authentication of the present invention, such as the example shown in FIG. 1).

If authentication is required (yes in decision block 209), the logic moves to decision block 211 where a test is made to determine if the authentication module is loaded. In exemplary embodiments, the authentication module is a plug-in module for the web browser. In exemplary embodiments, if the authentication module has not been loaded, a message will be displayed. For example, "This page protected by AuthentiPage, to get a free copy, go to Authentipage.com." Alternatively, the message may ask the user if a download of the authentication module is desired. If the authentication module is not loaded, the logic moves to decision block 214 where a test is made to determine if the authentication module should be loaded. If the authentication module is not to be loaded, the logic moves to block 218 where the page is displayed without authentication. In exemplary embodiments, the user will be notified that the page could not be authenticated, for example via a pop-up window displaying a warning message. In alternative embodiments, the user defines a non-authenticity stamp which is displayed for a page that has not been authenticated.

If the authentication module is to be loaded (yes in decision block 214), the logic moves to block 216 where the authentication module is loaded as shown in FIG. 7 and described next. If a download of the authentication module is desired, the user may be automatically redirected to the download site.

FIG. 7 illustrates exemplary logic for loading an authentication module (block 216 of FIG. 6B). The logic of FIG. 7 moves from a start block to block 300 where the authentication module (e.g., plug-in) is downloaded. The download is accomplished using techniques known in the art. After the authentication module is downloaded to the user's computer, the logic moves to block 302 where the authentication module is configured. As part of the configuration process, an authenticity stamp is defined by the user. This authenticity stamp will be displayed whenever an authenticated page is loaded. The stamp can take several forms, for example, a user-selected keyword, color, etc. Preferably, the determination of the look of the authenticity stamp is under complete control of the user. Preferably, the user is also able to determine where the stamp will be displayed, for example in a separate pop-up box or in a selected area of the web page. By requiring the user to configure the visual qualities of the stamp, the possibility of a counterfeit stamp being displayed is reduced. The user will expect to see his or her stamp and will begin to associate the stamp with security. It will be appreciated that while the stamp is defined in terms of visual qualities herein, embodiments of the invention can include defining the stamp in other ways, for example, by an audio indication specified by the user. After the authentication module has been configured, the logic of FIG. 7 ends and processing returns to FIG. 6B.

Returning to FIG. 6B, after the authentication module is loaded (block 216), or if it has been determined that the authentication module is already loaded (yes in decision block 211), the logic moves to block 212 to verify the authenticity of the page and display the page, as shown in detail in FIG. 8 and described next.

FIG. 8 illustrates exemplary logic for verifying the authenticity of a page and displaying the page. The logic of FIG. 8 moves from a start block to block 400 where the authenticity of the page is verified. Many algorithms can be used to verify the authenticity. For example, the trusted server that generates the authenticity key can encrypt the authenticity key with a private key. The user can then decrypt the authenticity key using a public key. Using this method, no certificate is required and no interaction is required by the user. Other algorithms can be used, some of which may require a certificate and/or user interaction. Unless the page contains confidential information, the authentication of pages should not require any additional security or encryption. The authentication of a page can be employed on any page, for example, marketing data, purchase information, etc., to prove the page's authenticity. In general, authentication of pages will not require additional security or encryption. However, if additional security is desired, page authentication performed in accordance with the present invention can be used in combination with other known or future security measures, for example, in conjunction with a secure protocol, such as HTTPS, along with the requirement for a UserID and a password, etc. If the authentication is successful (yes in decision block 402), the logic moves to block 404 where the page is displayed with the authenticity stamp as defined by the user during the configuration process described above. If the authentication fails (no in decision block 402), the logic moves to block 406 where the unsuccessfully authenticated page is displayed. In exemplary embodiments, an indication of the authentication failure is provided, for example a warning message may be displayed. For example, a flashing error message, such as "PAGE NOT AUTHENTICATED" can be displayed in the location where the authenticity stamp would normally be displayed. After the page is displayed (either as an authenticated page in block 404 or as an unsuccessfully authenticated page in block 406), the logic of FIG. 8 ends and processing returns to FIG. 6B.

Returning to FIG. 6B, after a page has been displayed (block 210, 212 or 218) or a UserID/Password request has been processed, the logic moves to decision block 220 (FIG. 6A) where a test is made to determine if it is time to exit. For example, if the user selects an "Exit" option form a web browser menu, it is time to exit. If it is not time to exit, the logic returns to block 200 to wait for the user's next page request. The logic of blocks 200-220 is repeated until it is time to exit. It will be appreciated that in alternative embodiments of the invention requests other than those shown and described herein may also be processed. When it is time to exit, the logic of FIG. 6A ends.

FIG. 9 is a flow diagram illustrating exemplary logic performed by a web server 120 for performing authentication in accordance with the present invention. The logic of FIG. 9 moves from a start block to block 500 where the web server waits for a request. In exemplary embodiments, while the web server is waiting for a request other requests continue to be serviced (e.g., receiving and processing page requests). When a request is received, the logic moves to decision block 501 where a test is made to determine if the request is a request for validation of a UserID/Password. If so, the logic moves to block 502 where the received UserID/Password (sent in block 108 of FIG. 6A) is forwarded to the authentication server 140.

If the request is not a request for verification of a UserID/Password, the logic moves to decision block 504 where a test is made to determine if the request is a page request. If so, the logic moves to block 505 where the page request is read. The logic then moves to block 506 where the requested page is retrieved. Next, the logic moves to block 507 where the requested page is forwarded to an authentication server 140. The logic then moves to block 508 where the web server waits for the authenticated page to be returned from the authentication server. In exemplary embodiments, while the web server is waiting for an authenticated page, other processing can be performed, for example, page requests can be received and processed. When an authenticated page is received, the logic moves to block 510 where the authenticated page is returned to the user that requested the page.

If the request is not a request to verify a UserID/Password (no in decision block 501) or a page request (no in decision block 504), the request is another request, which is processed in block 512. Other requests which may be processed by a web Server are not described herein.

After the request (e.g., request for verification of UserID/Password, page request or other request) has been processed, the logic moves to decision block 514 where a test is made to determine if it is time to exit. The logic of blocks 500-514 is repeated until it is time to exit (e.g., shut down the web server). When it is time to exit, the logic of FIG. 9 ends.

FIG. 10 is a flow diagram illustrating exemplary logic performed by an authentication server 140 for performing authentication in accordance with the present invention. The logic of FIG. 10 moves from a start block to block 600 where the authentication server waits for an authentication request. When an authentication request is received, the logic moves to decision block 601 to determine if the request is a request to decrypt a UserID/Password. If so, the logic moves to block 602 where the UserID/Password is decrypted. The logic then moves to block 604 where the decrypted UserID/Password is forwarded to a security engine for verification. In exemplary embodiments, the security engine is an existing security engine, such as a DSS Security Engine. The Security Engine verifies the UserID/Password and forwards the verification as appropriate. For example, if the UserID is not valid, a message will be displayed on the user's computer. Because security engines are known in the art, the logic employed by the security engine is not discussed further herein.

If the request is not a request to decrypt a UserID/Password, the logic moves to decision block 606 where a test is made to determine if the request is an authentication request. If so, the logic moves to block 608 where the authentication server generates an authenticity key. Details for an exemplary authenticity key are described below. The logic of FIG. 10 then moves to block 610 where the authenticity key is inserted into the web page. An exemplary authenticity key is shown in FIG. 12. Next, the logic moves to block 612 where the page which includes the authenticity key is returned to the web server.

While the exemplary embodiments only include processing of requests for encryption/decryption or authenticating a page, it will be appreciated that alternative embodiments may process other requests. After a request is processed (e.g., a UserID/Password is decrypted or a page is authenticated), the logic moves to decision block 616 where a test is made to determine if it is time to exit. The logic of blocks 600-616 is repeated until it is time to exit (e.g., shut down the authentication server). When it is time to exit, the logic of FIG. 10 ends.

In alternative embodiments, there is no authentication server. Rather, graphical images include a hidden identifier identifying the true owner, as well as a cryptographic signature to ensure that the graphical image cannot be tampered with by a counterfeiter. In various embodiments, the identification is a portion of a URL that is encrypted, such as "bigbank.com". Those skilled in the art will recognize this as a second-level domain name. Upon receipt of the web page, the authentication module residing on the user's computer compares the identification in the page with the URL from which the web page was fetched. If the identification matches, the web page was served by its true owner. If the identifications do not match, the user is provided with an indication that the URL is not the true owner of the graphical images. For example, a "counterfeit" site may look just like the site that it was intended to look like because the counterfeiter can copy the page, including the graphical images. However, if the graphical images include a hidden identifier, the user can be notified that the page is "counterfeit."

An exemplary authenticity key is constructed in such a way that "freshness" can be determined, for example using a date/time stamp. The authenticity key will also include other identifying information as described later. An exemplary authenticity key contains one or more hidden signature objects. In exemplary embodiments, the hidden signature object is a value that is the encoding of the following fields: web page hash, action, date/time, key identifier and digital signature. In exemplary embodiments, the web page hash is generating using SHA-1 on the entire web page excluding this hidden signature object. The Secure Hash Algorithm (SHA) was developed by the National Institute of Standards and Technology (NIST) and is specified in the Secure Hash Standard (SHS, FIPS 180). SHA-1 is a revision to SHA that was published in 1994. SHA-1 is also described in the ANSI X9.30 (part 2) standard. The algorithm takes a message of greater than 264 bits in length and produces a 160-bit message digest.

The action is a value used to specify the action to be performed by the browser plug-in that verifies this page. Preferably, if the user computer does not have the browser plug-in installed, the user will be informed of the required plug-in. Preferably, the user can elect to download the plug-in at the time the web page is received, in which case the web page can be displayed immediately after installing the plug-in. In exemplary embodiments if the user elects not to install the plug-in, the web page is displayed and the user is provided with an indication (e.g., a warning message displayed in a pop-up window) that the page was not authenticated. Actions are specified in a bit-wise manner so that multiple actions can be specified. For example, the action value may be defined to both display the security object (e.g., to display a bitmapped image) and to request a secure login.

The date/time field is used to specify the current date and time that the web page was delivered from the web server. This value is used by the browser plug-in to verify that the page is "fresh" (e.g., is not being replayed by a rogue site). The present invention may include a synchronization feature which allows the user's computer to synchronize its internal clock with atomic clocks available over the Internet. This would provide additional security by allowing a more precise verification of the date/time stamp.

The key identifier is used to identify the public key used to verify the signature. In exemplary embodiments, a digital signature is used as a salt value concatenated with an SHA-1 hash of the other four fields (web page hash, action, date/time and key identifier) that has been encrypted using the private key of the web Page server. A "salt value" is an arbitrary random value that constantly changes in order to minimize the possibility of various attacks.

In exemplary embodiments of the present invention, four keys are used in the web page authentication process: a private key, a public key, a master encryption key and a preferences encryption key. A private key (of the web page server) is used to create the "digital signature" within the web page signature. A digital signature is generally defined to include a certificate. For the purposes of the present invention, exemplary embodiments do not include a certificate. It will be appreciated that various embodiments can include a certificate in the digital signature. The private key is only distributed to applications requiring its use. A public key is buried in multiple pieces throughout the browser plug-in. The public key is used to verify the Digital Signature within the web Page signature. Although the public key itself can be distributed, its storage location should remain as obscure as possible to reduce the possibility of attacks. The master encryption key is also buried in multiple places in the browser plug-in. The master encryption key is used to encrypt the preferences encryption key that is stored on the user's computer. The preferences encryption key that is stored on the user's computer is used to encrypt preferences (e.g., user configuration information, such as appearance and location of authenticity stamp) that are stored on the user's computer.

When the action indicates a Login, the browser plug-in displays a user ID and password request on the user's computer along with the secure word that will authenticate the UserID and Password request. These two values will be prefixed with the salt value and date/time information from the web page signature and encrypted using the public key. This information will then be sent by the plug-in performing the Submit. Preferably, the Submit explicitly references the URL to which the information is to be sent. This will allow the information only to be sent to the destination that was previously signed within the web Page signature.

The preferences file is used to store information, such as a user's secure word. Preferably, the preferences file is placed in a random directory to help obscure the location of the preference file and facilitate the creation of unique user configurations. This increases the difficulty in creating a general purpose rogue program for extracting preferences and keys.

In exemplary embodiments, new keys are implemented through redistribution of the browser plug-in. The new plug-in can contain both the old and new keys to facilitate implementation of the new keys on a particular date.

In exemplary embodiments of the invention, the authentication module may contain a list of all known UserIDs. The list of known UserIDs can be displayed so that the user can select a desired UserID. Upon selection of a UserID, the user is prompted to enter a password. The UserID and password are encrypted with the use of the public key to authenticate the authenticity key. The entire string (e.g., [UserID][Password][original salt value]) is sent to the trusted server for verification. The trusted server 120 then extracts the UserID and password and forwards them to the authentication server 140 for verification.

Exemplary embodiments allow a user to check the validity of their authentication module. A server allows the authentication module to send a request for self-verification. In various embodiments, the validation is performed in response to a user request. In exemplary embodiments, the authentication module includes a suitable user interface which allows a user to request self-verification. The authentication module generates a random number ("salt") and encrypts it with the public key. The value is then sent to a known URL (e.g., a URL that is hard-coded in the authentication module). When the authentication module receives the request, it is decrypted using the private key and adding an additional salt value, which is then returned to the client module (user). The client module decrypts the response received from the authentication module. The random values are then compared (without the additional salt added by the authentication module). If the value matches the value originally sent, the self-verification is successful. A verification result is displayed to the user to indicate whether the verification was successful.

In embodiments where the stamp comprises personal account information or a fractal, as previously described, the embodiments may or may not employ all of the steps as disclosed in reference to FIGS. 5-11. For example, the inclusion of a consumer's personalized fractal design within content may provide a sufficient level of confidence that the content being viewed is from a legitimate source. Further, the inclusion of information only known by the consumer and supplier of the content may also provide a reasonable level of confidence. However, these two embodiments may be combined with the embodiment of FIG. 5 to create an additional security tier. For example, web server 120 may invoke a computer generated imagery (CGI) application to create a fractal according to a pre-defined unique algorithm and may further dynamically sign the content with a private key and additional information, as described above.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the invention is frequently described as pertaining to an authentication system. It will be appreciated, however, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, while the exemplary embodiment will be described as an authentication system, the system contemplates the use, sale or distribution of any goods, services or information over any network having similar functionality described herein.

The consumer and merchant may represent individual people, entities, or business. The bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing system to facilitate online commerce transactions. The consumer has a computing unit in the form of a personal computer, although other types of computing units may be used including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a mini-computer, a PC server, a network set of computers, and the like.

The computing units are connected with each other via a data communication network. The network is a public network and assumed to be insecure and open to eavesdroppers. In the illustrated implementation, the network is embodied as the Internet. In this context, the computers may or may not be connected to the Internet at all times. For instance, the consumer computer may employ a modem to occasionally connect to the Internet, whereas the bank computing center might maintain a permanent connection to the Internet. It is noted that the network may be implemented as other types of networks, such as an interactive television (ITV) network.

Any merchant computer and bank computer are interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. In an exemplary embodiment, the electronic commerce system is implemented at the consumer and issuing bank. In an exemplary implementation, the electronic commerce system is implemented as computer software modules loaded onto the consumer computer and the banking computing center. The merchant computer does not require any additional software to participate in the online commerce transactions supported by the online commerce system.

The corresponding structures, materials, acts and equivalents of all elements in the claims below are intended to include any structure, material or acts for performing the functions in combination with other claimed elements as specifically claimed. The scope of the invention should be determined by the allowed claims and their legal equivalents, rather than by the examples given above.

What is claimed is:

1. A method for authenticating at least one web page, the method comprising:
    storing at least one authenticity stamp in a preferences file located in a secure location;
    receiving a request from a client computer for the at least one web page;
    creating, by an authentication server, formatted data by inserting an authenticity key into the requested at least one web page;
    sending the formatted data to the client computer;
    providing information to allow the client computer to extract the authenticity key from the formatted data; and
    receiving, at a server, a request to find additional information used to locate the preferences file and then:
        providing the additional information for decoding to determine the secure location of the preferences file;
        decoding the additional information and determining the secure location of the preferences file;
        locating the preferences file in the secure location;
        retrieving the at least one authenticity stamp from the preferences file; and enabling the at least one authenticity stamp to be displayed with the formatted data on a display of the client computer.

2. The method of claim 1, wherein the secure location is at least one of a random directory and a location not readily known by the client computer in order to obscure the location of the preferences file.

3. The method of claim 2, wherein the additional information is a preferences key.

4. The method of claim 3, wherein the authenticity stamp is selected by a user of the client computer.

5. The method of claim 4, wherein the display of the authenticity stamp with the formatted data on the display on the client computer serves to authenticate the formatted data to the user of the client computer.

6. The method of claim 5, wherein the preferences file includes an image used for the authenticity stamp.

7. The method of claim 6, wherein the authenticity key changes with each request for a web page.

8. The method of claim 1, wherein the server is a web server.

9. A method for authenticating at least one web page, the method comprising:
   storing at least one authenticity stamp in a preferences file located in a secure location;
   receiving a request from a client computer for the at least one web page;
   creating, by an authentication server, formatted data by inserting an authenticity key into the requested at least one web page;
   sending the formatted data to the client computer;
   providing information to allow the client computer to extract the authenticity key from the formatted data; and
   finding additional information used to locate the preferences file based on a request received at a server, and then:
   providing the additional information for decoding to determine the secure location of the preferences file;
   decoding the additional information to determine the secure location of the preferences file;
   locating the preferences file in the secure location;
   retrieving the at least one authenticity stamp from the preferences file; and
   enabling the at least one authenticity stamp to be displayed with the formatted data on a display of the client computer.

10. The method of claim 9, wherein the secure location is at least one of a random directory and a location not readily known by the client computer in order to obscure the location of the preferences file.

11. The method of claim 10, wherein the additional information is a preferences key.

12. The method of claim 11, wherein the authenticity stamp is selected by a user of the client computer.

13. The method of claim 12, wherein the display of the authenticity stamp with the formatted data on the display on the client computer serves to authenticate the formatted data to the user of the client computer.

14. The method of claim 13, wherein the preferences file includes an image used for the authenticity stamp.

15. The method of claim 14, wherein the authenticity key changes with each request for a web page.

16. The method of claim 9, wherein the server is a web server.

* * * * *